United States Patent
Li et al.

(10) Patent No.: US 12,171,002 B2
(45) Date of Patent: Dec. 17, 2024

(54) INFORMATION MAPPING METHOD, INFORMATION ACQUISITION METHOD, TERMINAL DEVICE AND NETWORK DEVICE

(71) Applicant: ZTE Corporation, Guangdong (CN)

(72) Inventors: Yong Li, Guangdong (CN); Hao Wu, Guangdong (CN); Zhaohua Lu, Guangdong (CN); Jun Xu, Guangdong (CN)

(73) Assignee: ZTE Corporation, Shenzhen (CN)

(*) Notice: Subject to any disclaimer, the term of this patent is extended or adjusted under 35 U.S.C. 154(b) by 336 days.

(21) Appl. No.: 17/489,323

(22) Filed: Sep. 29, 2021

(65) Prior Publication Data
US 2022/0030584 A1    Jan. 27, 2022

Related U.S. Application Data

(63) Continuation of application No. PCT/CN2020/080647, filed on Mar. 23, 2020.

(30) Foreign Application Priority Data

Mar. 29, 2019    (CN) ............ 201910251631.3

(51) Int. Cl.
*H04W 72/21* (2023.01)
*H04B 7/06* (2006.01)

(52) U.S. Cl.
CPC .......... *H04W 72/21* (2023.01); *H04B 7/0626* (2013.01)

(58) Field of Classification Search
CPC ... H04W 72/21; H04B 7/0626; H04B 7/0417; H04B 7/0632; H04B 7/0634; H04B 7/0636; H04B 7/0663; H04B 7/10; H04B 7/0486; H04B 7/0456; H04B 7/0639
See application file for complete search history.

(56) References Cited

U.S. PATENT DOCUMENTS

| | | | |
|---|---|---|---|
| 10,812,164 | B2 | 10/2020 | Park et al. |
| 11,128,354 | B2 | 9/2021 | Rahman et al. |
| 11,558,094 | B2 | 1/2023 | Wu et al. |

(Continued)

FOREIGN PATENT DOCUMENTS

| | | |
|---|---|---|
| CN | 106257856 A | 12/2016 |
| CN | 108259154 A | 7/2018 |

(Continued)

OTHER PUBLICATIONS

European Search Report for EP Patent Application No. 20785391.2, dated Nov. 18, 2022, 14 pages.

(Continued)

*Primary Examiner* — Sharmin Chowdhury
(74) *Attorney, Agent, or Firm* — Perkins Coie LLP

(57) ABSTRACT

Provided are an information mapping method, an information acquisition method, a terminal device, and a network device. The information mapping method includes mapping at least one information domain of channel state information to at least one field of uplink control information, dividing the at least one field into a first partial field and a second partial field, generating a first bit sequence based on the first partial field, and generating a second bit sequence based on the second partial field.

18 Claims, 5 Drawing Sheets

(56) References Cited

U.S. PATENT DOCUMENTS

| | | | |
|---|---|---|---|
| 2014/0003269 | A1 | 1/2014 | Golitschek Edler von Elbwart et al. |
| 2017/0070914 | A1 | 3/2017 | Chun et al. |
| 2019/0081678 | A1 | 3/2019 | Park et al. |
| 2021/0083743 | A1* | 3/2021 | Faxér .................. H04L 5/0057 |
| 2022/0123805 | A1* | 4/2022 | Chung ................. H04L 5/005 |
| 2022/0123806 | A1 | 4/2022 | Li et al. |
| 2022/0149908 | A1* | 5/2022 | Gao .................... H04B 7/0634 |

FOREIGN PATENT DOCUMENTS

| | | |
|---|---|---|
| CN | 109150457 A | 1/2019 |
| CN | 109412663 A | 3/2019 |
| CN | 110535498 A | 12/2019 |
| CN | 110535504 A | 12/2019 |
| JP | 2022-517608 A | 3/2022 |
| JP | 2022-518719 A | 3/2022 |
| WO | 2019050159 A1 | 3/2019 |

OTHER PUBLICATIONS

LG Electronics, "Text proposals on TS 38.212 for LI reporting," 3GPP TSG RAN WG1 Meeting AH 1801, R1-1800361, Vancouver, Canada, Jan. 22-26, 2018, 6 pages.

Samsung, "CSI enhancement for MU-MIMO," 3GPP TSG RAN WG1 AH-1901, R1-1901276, Taipei, Taiwan, Jan. 21-25, 2019, 10 pages.

Zte, "CSI Enhancement for MU-MIMO Support," 3GPP TSG RAN WG1 Meeting #96bis, R1-1904012, Xi'an, China, Apr. 8-12, 2019, 15 pages.

Chinese office action issued in CN Patent Application No. 202210321561.6, dated Aug. 24, 2023, 26 pages. English translation included.

International Preliminary Report on Patentability issued in International Patent Application No. PCT/CN2020/080647, dated Sep. 28, 2021, 6 pages.

International Search Report and Written Opinion mailed on Jun. 19, 2020 for International Application No. PCT/CN2020/080647, filed on Mar. 23, 2020 (12 pages).

Qualcomm Incorporated, "On Type II CSI Feedback," 3GPP TSG RAN WG1 #89, Hangzhou, China, R1-1708593, 10 pages, May 14-19, 2017.

Australian examination report issued in AU Patent Application No. 2020251598, dated Oct. 10, 2023, 3 pages.

Chinese office action issued in CN Patent Application No. 202210321561.6, dated Mar. 28, 2024, 7 pages. English translation included.

Australian notice of acceptance issued in AU Patent Application No. 2020251598, dated May 31, 2024, 3 pages.

Chinese Notification to Complete Formalities of Registration issued in CN Patent Application No. 202210321561.6, dated Jul. 12, 2024, 7 pages. English translation included.

LG Electronics, "Evaluation on quantization methods for Type II overhead reduction," 3GPP TSG RAN WG1 #96, R1-1903357, Athens, Greece, Feb. 25-Mar. 1, 2019, 6 pages.

Japanese notice of allowance issued in JP Patent Application No. 2021-557995, dated Aug. 19, 2024, 4 pages. English translation included.

European Communication pursuant to Article 94(3) EPC issued in EP Patent Application No. 20785391.2, dated Oct. 21, 2024, 8 pages.

* cited by examiner

INFORMATION MAPPING METHOD, INFORMATION ACQUISITION METHOD, TERMINAL DEVICE AND NETWORK DEVICE

The present application is a continuation of and claims the benefit of International Patent Application No. PCT/CN2020/080647, filed Mar. 23, 2020, which claims priority to Chinese Patent Application No. 201910251631.3 filed with the China National Intellectual Property Administration (CNIPA) on Mar. 29, 2019, the disclosure of which is incorporated herein by reference in its entirety.

TECHNICAL FIELD

The present application relates to the technical field of wireless communication, for example, an information mapping method, an information acquisition method, a terminal device, a network device, a communication system, and a storage medium.

BACKGROUND

In wireless communication technology, the precoding technology of the multi-antenna technology improves the performance of communication by applying precoding to transmit antennas.

Generally, a transmitting side transmits one reference signal (RS) on one resource, and a receiving side uses the reference signal to measure channel state information (CSI) and then feeds back the measured channel state information in the form of precoding. Precoding is generally fed back in the manner of precoding matrix indicator (PMI) information. One constitution manner of precoding is that W=VCU, where W denotes single-layer precoding. However, the processing manner of how to map the indication information of the preceding matrices V, U, and C to uplink control information is still lacking.

SUMMARY

The present application provides an information mapping method, an information acquisition method, a terminal device, a network device, a communication system, and a storage medium.

Embodiments of the present application provide an information mapping method. The method includes the steps below.

One or more information domains of channel state information are mapped to one or more fields of uplink control information.

The one or more fields are divided into a first partial field and a second partial field. In this step, the first partial field is used for carrying at least one of the following information domains of the channel state information: a domain indicating a rank of precoding, a domain indicating a wideband channel quality indicator of a first transport block, a domain indicating a subband differential channel quality indicator of the first transport block, or a domain indicating the number of fed-back elements in a first matrix; the second partial field is used for carrying at least one of the following information domains of the channel state information: a domain indicating the information of a second matrix, a domain indicating the position of the strongest coefficient in the first matrix, a domain indicating the reference amplitude of a second polarization direction, or a domain indicating the fed-back elements in the first matrix; the domain indicating the fed-back elements in the first matrix includes a domain indicating amplitudes of the fed-back elements in the first matrix and a domain indicating phases of the fed-back elements in the first matrix; and elements in the second matrix are used for indicating positions of the fed-back elements in the first matrix.

A first bit sequence is generated based on the first partial field, and a second bit sequence is generated based on the second partial field.

Embodiments of the present application provide an information acquisition method. The method includes the steps below.

A first bit sequence and a second bit sequence are acquired from uplink control information.

A first partial field is acquired from the first bit sequence, and a second partial field is acquired from the second bit sequence.

One or more information domains constituting channel state information are acquired based on the first partial field and the second partial field.

The first partial field is used for carrying at least one of the following information domains of the channel state information: a domain indicating a rank of precoding, a domain indicating a wideband channel quality indicator of a first transport block, a domain indicating a subband differential channel quality indicator of the first transport block, or a domain indicating the number of fed-back elements in a first matrix.

The second partial field is used for carrying at least one of the following information domains of the channel state information: a domain indicating the information of a second matrix, a domain indicating the position of the strongest coefficient in the first matrix, a domain indicating the reference amplitude of a second polarization direction, or a domain indicating the fed-back elements in the first matrix; and the domain indicating the fed-back elements in the first matrix includes a domain indicating amplitudes of the fed-back elements in the first matrix and a domain indicating phases of the fed-back elements in the first matrix.

Elements in the second matrix are used for indicating positions of the fed-back elements in the first matrix.

Embodiments of the present application provide a terminal device. The terminal device includes a mapping unit and a processing unit.

The mapping unit is configured to map one or more information domains of channel state information to one or more fields of uplink control information.

The processing unit is configured to divide the one or more fields into a first partial field and a second partial field, to generate a first bit sequence based on the first part of the at least one field, and to generate a second bit sequence based on the second part of the at least one field.

The first partial field is used for carrying at least one of the following information domains of the channel state information: a domain indicating a rank of precoding, a domain indicating a wideband channel quality indicator of a first transport block, a domain indicating a subband differential channel quality indicator of the first transport block, or a domain indicating the number of fed-back elements in a first matrix.

The second partial field is used for carrying at least one of the following information domains of the channel state information: a domain indicating the information of a second matrix, a domain indicating the position of the strongest coefficient in the first matrix, a domain indicating the reference amplitude of a second polarization direction, or a domain indicating the fed-back elements in the first matrix;

and the domain indicating the fed-back elements in the first matrix includes a domain indicating amplitudes of the fed-back elements in the first matrix and a domain indicating phases of the fed-back elements in the first matrix.

Elements in the second matrix are used for indicating positions of the fed-back elements in the first matrix.

Embodiments of the present application provide a network device. The network device includes an information acquisition unit and an information processing unit.

The information acquisition unit is configured to acquire a first bit sequence and a second bit sequence from uplink control information, to acquire a first partial field from the first bit sequence, and to acquire a second partial field from the second bit sequence.

The information processing unit is configured to acquire one or more information domains constituting channel state information based on the first partial field and the second partial field.

The first partial field is used for carrying at least one of the following information domains of the channel state information: a domain indicating a rank of precoding, a domain indicating a wideband channel quality indicator of a first transport block, a domain indicating a subband differential channel quality indicator of the first transport block, or a domain indicating the number of fed-back elements in a first matrix.

The second partial field is used for carrying at least one of the following information domains of the channel state information: a domain indicating the information of a second matrix, a domain indicating the position of the strongest coefficient in the first matrix, a domain indicating the reference amplitude of a second polarization direction, or a domain indicating the fed-back elements in the first matrix; and the domain indicating the fed-back elements in the first matrix includes a domain indicating amplitudes of the fed-back elements in the first matrix and a domain indicating phases of the fed-back elements in the first matrix.

Elements in the second matrix are used for indicating positions of the fed-back elements in the first matrix.

Embodiments of the present application provide a terminal device. The terminal device includes a processor and a memory configured to store a computer program executable on the processor. The memory is configured to store a computer program, and the processor is configured to call and execute the computer program stored in the memory to perform preceding steps.

Embodiments of the present application provide a network device. The terminal device includes a processor and a memory configured to store a computer program executable on the processor. The memory is configured to store a computer program, and the processor is configured to call and execute the computer program stored in the memory to perform preceding steps.

Embodiments of the present application provide a communication system. The communication system includes a preceding terminal device and a preceding network device.

Embodiments of the present application provide a storage medium. The storage medium is configured to store a computer program that, when executed by a processor, implements any one of the methods of embodiments of the present application.

Through preceding embodiments, one or more information domains of the channel state information are mapped to the uplink control information, specifically, to a first partial field and a second partial field that are in the uplink control information; moreover, a first bit sequence and a second bit sequence are formed by the first partial field and the second partial field respectively.

In this case, the channel state information is mapped to the uplink control information.

DETAILED DESCRIPTION

Embodiments of the present application are described hereinafter in detail in conjunction with the drawings. It is to be noted that if not in collision, embodiments and features therein in the present application may be combined with each other in any manner.

Figure 1:
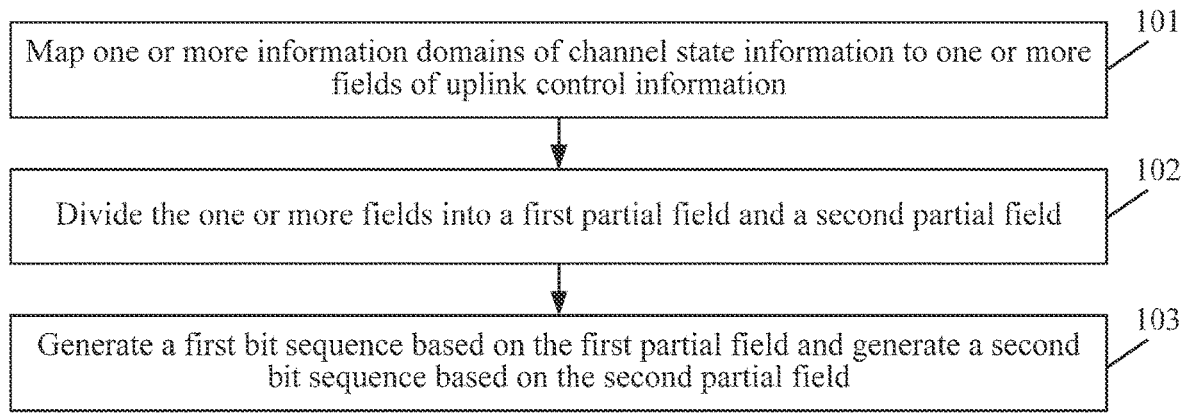
FIG. 1 is a flowchart of an information mapping method according to an embodiment of the present application.

In one exemplary embodiment, an information mapping method is provided, as shown in FIG. 1. The method includes the steps below.

In step 101, one or more information domains of channel state information are mapped to one or more fields of uplink control information.

In step 102, the one or more fields are divided into a first partial field and a second partial field. The first partial field is used for carrying at least one of the following information domains of the channel state information: a domain indicating a rank of precoding, a domain indicating a wideband channel quality indicator of a first transport block, a domain indicating a subband differential channel quality indicator of the first transport block, or a domain indicating the number of fed-back elements in a first matrix; the second partial field is used for carrying at least one of the following information domains of the channel state information: a domain indicating the information of a second matrix, a domain indicating the position of the strongest coefficient in the first matrix, a domain indicating the reference amplitude of a second polarization direction, or a domain indicating the fed-back elements in the first matrix; the domain indicating the fed-back elements in the first matrix includes a domain indicating amplitudes of the fed-back elements in the first matrix and a domain indicating phases of the fed-back elements in the first matrix; and elements in the second matrix are used for indicating positions of the fed-back elements in the first matrix.

In step 103, a first bit sequence is generated based on the first partial field, and a second bit sequence is generated based on the second partial field.

This embodiment applies to a terminal device. After the preceding processing is completed, the method may further include a step of sending the uplink control information to a network device.

The network device may be a device in the network, for example, specifically, a base station in the network.

Figure 2:
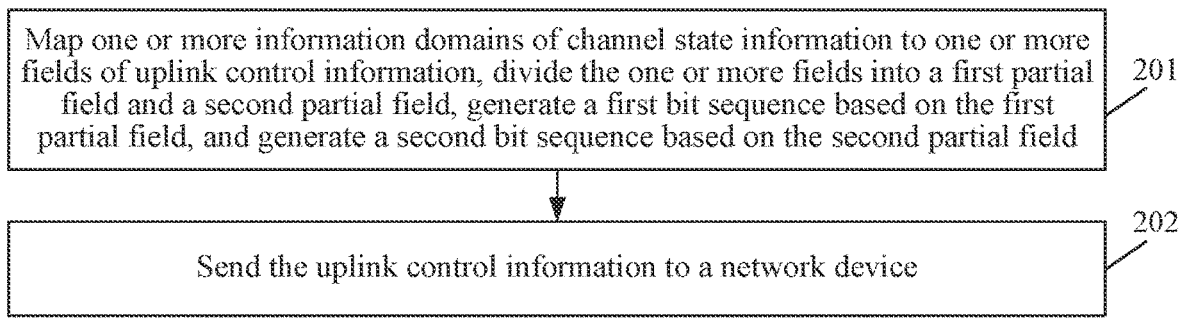
FIG. 2 is a flowchart of an information mapping method according to another embodiment of the present application.

Referring to FIG. 2, this embodiment may include the processing flow below.

In step 201, one or more information domains of channel state information are mapped to one or more fields of uplink control information; the one or more fields are divided into a first partial field and a second partial field; and a first bit sequence is generated based on the first partial field, and a second bit sequence is generated based on the second partial field.

In step 202, the uplink control information is sent to a network device.

In step 202, the uplink control information finally sent to the network device is the uplink control information including the first bit sequence and the second bit sequence, that is, the uplink control information to which one or more information domains of the channel state information are mapped.

The constitution manner of precoding involved in this embodiment is firstly described hereinafter by taking an example in which the network device is a base station and a single layer in the multi-layer precoding is adopted. Specifically, the manner may be as follows: W=VCU.

W denotes single-layer precoding, which is a matrix of $N_{Tx}$ rows and $N_3$ columns. $N_{Tx}$ denotes the number of antenna ports. $N_3$ denotes the number of PMI frequency domain units. That is, the rows of W correspond to the antenna ports and the columns of W correspond to the frequency domain units $$V = \begin{bmatrix} v_0, v_1, \ldots, v_{L-1} & 0 \\ 0 & v_0, v_1, \ldots, v_{L-1} \end{bmatrix}.$$

It is a matrix consisting of a zero element and L column vectors $v_l$, where l=0,1 . . . , L−1, L is a positive integer, and a vector $v_l^T$ is referred to as a spatial vector.

$U=[u_0^T, u_1^T, \ldots, u_{M-1}^T]^T$ It is a matrix consisting of M row vectors $u_m$, where T denotes the transposition of the matrix, m=0, 1, . . . , M−1, M is a positive integer, and a vector $u_m$ is referred to as a frequency domain vector.

A first matrix in this embodiment may be denoted by C as follows specifically:

$$C = \begin{bmatrix} c_{0,0} & c_{0,1} & \ldots & c_{0,M-1} \\ c_{1,0} & c_{1,1} & \ldots & c_{1,M-1} \\ \vdots & \vdots & \ldots & \vdots \\ c_{2L-1,0} & c_{2L-1,1} & \ldots & c_{2L-1,M-1} \end{bmatrix}.$$

It is a matrix of 2L rows and M columns, the elements of which are the coefficients of the column vectors in the matrix V and the coefficients of the row vectors in the matrix U.

A second matrix in the preceding embodiment may be $C_{map}$. Specifically, a terminal device feeds back the L vectors $v_l$ constituting the matrix V to the base station, feeds back the M vectors $u_m$ constituting the matrix U, uses the bit matrix $C_{map}$ of 2L rows and M columns to indicate the positions of the fed-back elements in the matrix C in the manner of the bitmap, and feeds back corresponding coefficients indicated in the matrix C. An element in the matrix $C_{map}$ corresponds to an element at the same position in the matrix C. A coefficient in the matrix not fed back or indicated in the manner of the bitmap is 0 by default. It is to be noted here that a fed-back element may refer to a fed-back coefficient in the first matrix C.

The vectors $v_l$ are selected from a predefined codebook. The vectors $u_m$ are selected from a predefined codebook. The number of elements in the vectors $u_m$ is referred to as the number $N_3$ of PMI frequency domain units and is equal to the number of base vectors in the predefined codebook where vectors $u_m^T$ are located. Accordingly, $N_3$ also denotes the number of base vectors in the predefined codebook where the vectors $u_m^T$ are located.

In order to control the resource overhead of the PMI fed back by the terminal and the accuracy of the feedback, the base station transmits parameters (L, M, $K_0$) controlling a feedback report to the terminal. The terminal feeds back to the station the L vectors $v_l$ constituting the matrix V, the M vectors $u_m$ constituting the matrix U, and a maximum of $K_0$ coefficients in the matrix C.

When the precoding fed back by the terminal is used for layer 1 transmission in the spatial domain, the rank of the precoding is referred to as 1; when the rank of the precoding fed back by the terminal is used for the layer 2 transmission in the spatial domain, the precoding rank is referred to as 2; similarly, when the precoding fed back by the terminal is used for the layer RI transmission in the spatial domain, the rank of the precoding is referred to as RI and for example, RI=1, 2, 3, 4. The terminal feeds back the rank of the precoding and the precoding. The base station transmits to the terminal the control parameters (L, M, $K_0$) corresponding to each possible rank and corresponding to the report of the PMI of each layer of a rank.

The channel state information in this embodiment is composed of multiple parts of information; each part of information is referred to as an information domain; and a domain indicating a certain part of information has the same meaning as a certain part of information. A field is a bit or a sequence of bits that carries information; that is, the information is represented by a segment of bit sequence. The first matrix indicates the coefficients in the matrix C, that is, the elements in the matrix C. The reference amplitude of a second polarization direction is the reference amplitude of the coefficients belonging to the second polarization direction in the matrix C. The reference amplitude of a first polarization direction is the reference amplitude of the coefficients belonging to the first polarization direction in the matrix C and is 1 by default. For a domain indicating a coefficient amplitude in the first matrix in the matrix C, a coefficient amplitude refers to a differential amplitude of a coefficient as for the second polarization direction and also refers to a differential amplitude of a coefficient as for the first polarization direction.

As for the preceding processing flow, step 101 in which the one or more information domains of the channel state information are mapped to the one or more fields of the uplink control information may include the step below.

The domain indicating the information of the second matrix in the channel state information is mapped to a first field of the uplink control information. In this step, the first field includes a one-dimensional sequence, and the one-dimensional sequence is obtained by mapping two-dimensional matrix elements of the second matrix.

It is to be noted here that in this embodiment, the ordinal numerals "first" and "second" in a first field and a second field do not indicate the order of the fields and are only used for distinguishing different fields, thus being irrelevant to the specific arrangement order. For example, the first field may be located before the second field; alternatively, the first field may be located after the second field. Of course, this embodiment may further include more fields, for example, a third field, a fourth field, and a fifth field. The ordinal numerals including "third", "fourth", and "fifth" do not indicate the arrangement order of the fields and are only used for distinguishing one field from another. When the fields are arranged specifically, the arrangement order may be as follows: the first field—the second field—the fourth field—the sixth field—the third field—the fifth field. The arrangement order of the fields in this embodiment is not based on the expression thereof but based on a subsequent rule or description, which is not described repeatedly hereinafter.

Specifically, the mapping may be performed in the manner that the two-dimensional matrix elements are sequentially added to the one-dimensional sequence based on the ascending order of the rows in the second matrix. Finally, the mapped one-dimensional sequence is taken as the first field of the uplink control information.

For example, the second matrix may be that $$C_{map} = \begin{bmatrix} d_{0,0} & d_{0,1} & \cdots & d_{0,M-1} \\ d_{1,0} & d_{1,1} & \cdots & c_{1,M-1} \\ \vdots & \vdots & \cdots & \vdots \\ d_{2L-1,0} & d_{2L-1,1} & \cdots & d_{2L-1,M-1} \end{bmatrix},$$

which is a two-dimensional bit matrix of 2L rows and M columns; the elements thereof indicate, in the manner of the bitmap, whether the elements in the first matrix where $$C = \begin{bmatrix} c_{0,0} & c_{0,1} & \cdots & c_{0,M-1} \\ c_{1,0} & c_{1,1} & \cdots & c_{1,M-1} \\ \vdots & \vdots & \cdots & \vdots \\ c_{2L-1,0} & c_{2L-1,1} & \cdots & c_{2L-1,M-1} \end{bmatrix}$$

are reported.

The mapping of the second matrix $C_{map}$ to the bit sequence in the field is the mapping of the two-dimensional matrix elements to the one-dimensional sequence. That is, the field mapped by the two-dimensional matrix is a one-dimensional sequence.

That is, the mapped field sequence is that $X_c=[x_0, x_1, \ldots, x_{2LM-1}]$. The mapping of the second matrix $C_{map}$ to the bit sequence in the first field of the uplink control information is performed based on the rows in the second matrix $C_{map}$. That is, following all the elements in a row in the second matrix $C_{map}$, all the elements in the next row in the second matrix $C_{map}$ are sequentially mapped to the sequence in the field.

For example, row in in the second matrix $C_{map}$ is that $d_{i_n}=[d_{i_n},^0, d_{i_n,1}, \ldots, d_{i_n,M-1}]$, where $n=\{0, 1, \ldots, 2L-1\}$. The second matrix $C_{map}$ is mapped to the sequence in the field based on the rows; that is, the elements in the sequence $[d_{i_0}, d_{i_1}, \ldots d_{i_{2L-1}}]$ are sequentially mapped to the sequence in the field; that is, the sequence $[d_{i_0,0}, d_{i_0},^1, \ldots, d_{i_0,M-1}, d_{i_1,0}, d_{i_1,1}, \ldots, d_{i_1,M-1}, \ldots, d_{i_{2L-1},0} d_{i_{2L-1},1}, \ldots, d_{i_{2L-1},M-1}]$ is sequentially mapped to the sequence in the field; and where if $m \neq n$, $I_m \neq i_n$.

In another example, the mapping of the second matrix $C_{map}$ to the bit sequence in the field is performed based on the ascending order of the rows in the second matrix. Row i in the second matrix $C_{map}$ is that $d_i=[d_{i,0}\ d_{i,1}\ \ldots\ d_{i,M-1}]$, where $i=\{0, 1, \ldots, 2L-1\}$. The second matrix $C_{map}$ is mapped to the sequence in the field based on the ascending order of the rows; that is, the elements in the sequence $[d_0, d_1, \ldots, d_{2L-1}]$ are sequentially mapped to the sequence in the first field; that is, the sequence $[d_{0,0}, d_{0,1} \ldots, d_{0,M-1}, d_{1,0}, d_{1,1} \ldots, d_{1,M-1}, \ldots, d_{2L-1,0}, d_{2L-1,1}, \ldots, d_{2L-1,M-1}]$ is sequentially mapped to the sequence in the first field.

The step in which the one or more information domains of the channel state information are mapped to the one or more fields of the uplink control information may further include the step below.

The domain indicating the position of the strongest coefficient in the first matrix in the channel state information is mapped to the second field of the uplink control information. Here the second field includes a sequence consisting of N bits, and N is an integer and is related to the maximum number of fed-back elements configured by a network device.

As for a sequence consisting of N bits, the determination of N is related to the maximum number of fed-back elements; for example, N may be determined based on the formula that $\lceil \log_2(K_0) \rceil$.

$K_0$ denotes the maximum possible number of the fed-back elements in the first matrix C that are configured by a base station for a terminal.

It is to be noted that the coefficients in the first matrix C are the elements in the first matrix C, and the coefficients refer to the coefficients of the columns in the matrix V and the coefficients of the rows in the matrix U. That is, the position of the strongest coefficient in the matrix C is the same as the position of the strongest element in the matrix C. The position of the strongest coefficient in the matrix C is (l*, m*), where l* denotes the reference number of the row where the strongest coefficient in the matrix C is located, and m* denotes the reference number of the column where the strongest coefficient in the matrix C is located. The strongest coefficient in the matrix C is only possible in the position of an element of the first matrix C indicated by the second matrix $C_{map}$. That is, it exists $K_0$ possible positions at most. A field sequence of $\lceil \log_2(K_0) \rceil$ bits is used for mapping one of the $K_0$ possible positions so that the overhead may be saved to the maximum extent.

For example, the correspondence relationship between the positions indicated in the field of the second matrix $C_{map}$ and the sequence states with the sequences constituted by $\lceil \log_2(K_0) \rceil$ bits is a first correspondence relationship. Based on the first correspondence relationship, $\lceil \log_2(K_0) \rceil$ bits are used for indicating the position of the strongest coefficient in the first matrix C.

Alternatively, the correspondence relationship between the positions indicated in the field of the second matrix $C_{map}$ and the sequence states with the sequences constituted by $\lceil \log_2(K_0) \rceil$ bits is a second correspondence relationship. Based on the second correspondence relationship, $\lceil \log_2(K_0) \rceil$ bits are used for indicating the position of the strongest coefficient in the first matrix C.

Specifically, the first correspondence relationship is that the positions indicated in the field of the second matrix $C_{map}$ sequentially correspond to the sequence states. For example, position 1 in the second matrix $C_{map}$ corresponds to the sequence state 0 with the sequence constituted by $\lceil \log_2(K_0) \rceil$ bits; then the indicated positions in ascending order correspond to the bit sequences in ascending order. For example, $K_1$ positions are indicated in the field of $C_{map}$.

Here {position 1, position 2, ..., position $K_1$} sequentially correspond to {sequence state 0, sequence state 1, ..., sequence state $K_1-1$} in a one-to-one manner. The sequence state n indicates that n denotes the numeral constituted by a sequence. For example, the bit sequence 001 whose lowest bit is on the right constitutes a numeral 1; the bit sequence 010 whose lowest bit is on the right constitutes a numeral 2; the bit sequence 100 whose lowest bit is on the right constitutes a numeral 4; the bit sequence 001 whose lowest bit is on the left constitutes a numeral 4; the bit sequence 010 whose lowest bit is on the left constitutes a numeral 2; and the bit sequence 100 whose lowest bit is on the left constitutes a numeral 1.

A sequence of N bits is used for indicating a position. For example, when a sequence state is 3 and the positions in the second matrix correspond to the sequence states from front to back in a one-to-one manner, this sequence state indicates position 4 in the second matrix.

Such arrangement in which the correspondence is performed based on the order of the positions indicated in the field of the second matrix $C_{map}$ can reduce the complexity of calculating the position of the strongest element in the first matrix C; the relationship in which the ascending order of the positions indicated in the field of the second matrix $C_{map}$ corresponds to the ascending order of the sequence states can reduce the complexity of calculating the position of the strongest element in the first matrix C; and the relationship in which the position 1 indicated in the field of the second matrix $C_{map}$ corresponds to the sequence state 0 can reduce the complexity of calculating the position of the strongest element in the first matrix C.

The second correspondence relationship is that position 1 indicated in the field of the second matrix $C_{map}$ corresponds to the sequence state ($2^b-1$) with the sequence constituted by $\lceil \log_2(K_0) \rceil$ bits; then the indicated positions in ascending order correspond to bit sequences in descending order. For example, $K_1$ positions are indicated in the field of the second matrix $C_{map}$; and here {position 1, position 2, ..., position $K_1$} sequentially correspond to {sequence state $2^b-1$, sequence state $2^b-2$, ..., sequence state $2^b-K_1$} in a one-to-one manner, where $\lceil \log_2(K_0) \rceil$. The sequence state n indicates that n denotes the numeral constituted by a sequence. For example, the bit sequence 001 whose lowest bit is on the right constitutes a numeral 1; the bit sequence 010 whose lowest bit is on the right constitutes a numeral 2; the bit sequence 100 whose lowest bit is on the right constitutes a numeral 4; the bit sequence 001 whose lowest bit is on the left constitutes a numeral 4; the bit sequence 010 whose lowest bit is on the left constitutes a numeral 2; and the bit sequence 100 whose lowest bit is on the left constitutes a numeral 1.

Similarly, such arrangement in which the correspondence is performed based on the order of the positions indicated in the field of the second matrix $C_{map}$ can reduce the complexity of calculating the position of the strongest element in the first matrix C; the relationship in which the ascending order of the positions indicated in the field of the second matrix $C_{map}$ corresponds to the descending order of the sequence states can reduce the complexity of calculating the position of the strongest element in the first matrix C; and the relationship in which the position 1 indicated in the field of the second matrix $C_{map}$ corresponds to the last sequence state can reduce the complexity of calculating the position of the strongest element in the first matrix C.

It is to be understood that the preceding illustrates only manners of how two information domains in the channel state information are mapped to corresponding fields. Corresponding processing manners are also applicable to other information domains. The content included in an information domain may be directly taken as the specific content of another corresponding field. For example, a coefficient amplitude included in the domain indicating a coefficient amplitude in the first matrix may be directly added to the uplink control information to serve as the third field. Of course, other processing manners may be applied and are not exhaustive here.

In preceding step 103, the first bit sequence is generated based on the first partial field, and the second bit sequence is generated based on the second partial field. Here as for generating the second bit sequence based on the second partial field, the description is first made as below.

The second field carrying the domain indicating the position of the strongest coefficient in the first matrix is configured after the first field carrying the domain indicating the information of the second matrix. Here the second field includes a sequence consisting of N bits, and N is an integer and is related to the maximum number of fed-back elements configured by a network device.

The manner of determining the sequence constituted by N bits included in the second field is as described above and is not repeated here.

The field carrying the domain indicating the information of the second matrix $C_{map}$ is relatively important since the acquisition of the position of the strongest coefficient in the first matrix C based on the field carrying the domain indicating the position of the strongest coefficient in the first matrix C needs to be dependent on the information of the second matrix $C_{map}$. In a bit sequence of the uplink control information, a field located at front is more reliable than a field located at the back.

For example, the second field carrying the domain indicating the position of the strongest coefficient in the first matrix C is located closely after the first field carrying the domain indicating the information of the second matrix $C_{map}$; alternatively, after the first field carrying the domain indicating the information of the second matrix $C_{map}$, one or more other fields follow, and then the second field carrying the domain indicating the position of the strongest coefficient in the first matrix C is added.

The step in which the second bit sequence is generated based on the second partial field may further include the step in which a third field carrying a domain indicating a coefficient amplitude in the first matrix is configured to be adjacent to a fourth field carrying a domain indicating a coefficient phase in the first matrix, where the third field and the fourth field correspond to the same coefficient in the first matrix.

For example, y denotes a fed-back and reported coefficient in the first matrix C; $A_y$ denotes the amplitude of y; $G_y$ denotes the field carrying $A_y$; $P_y$ denotes the phase of y; and $H_y$ denotes the field carrying $P_y$. In the second bit sequence, the field $G_y$ is closely adjacent to the field $H_y$ with no other field in between; for example, the two fields are arranged as $G_y H_y$ or $H_y G_y$.

In another example, z denotes another fed-back and reported coefficient in the first matrix C; $A_z$ denotes the amplitude of z; $G_z$ denotes the field carrying $A_z$; $P_z$ denotes the phase of z; and $H_z$ denotes the field carrying $P_z$. The fields carrying the amplitudes of the two coefficients and the fields carrying the phases of the two coefficients are arranged as $G_y H_y G_z H_z$, $H_y G_y H_z G_z$, $G_z H_z G_y H_y$, or $H_z G_z H_y G_y$; $G_y$ is closely adjacent to $H_y$ with no other field in between; and $G_z$ is closely adjacent to $H_z$ with no other field in between.

In this case, the arrangement in which the field carrying the amplitude of a coefficient is closely adjacent to the field carrying the phase of the coefficient can shorten the time for acquiring the coefficient. The acquired coefficient can be used without waiting for the acquisition of other coefficients; that is, the time of waiting for using the coefficient can be shortened.

The step in which the second bit sequence is generated based on the second partial field may further include the step below.

A fifth field carrying fed-back elements corresponding to the first polarization direction in the first matrix is configured before a sixth field carrying fed-back elements corresponding to the second polarization direction in the first matrix. Here the first polarization direction is a polarization direction corresponding to the strongest coefficient in the first matrix, and the second polarization direction is a polarization direction different from the first polarization direction.

The polarization direction of a coefficient in the first matrix C refers to the polarization direction of the column vector that corresponds to the coefficient and is in the matrix V. In this column vector, the element corresponding to the antenna port of the polarization direction is not zero, and the element corresponding to the antenna port of the other polarization direction is zero.

In another aspect, the rows with the first half of sequence numbers in the first matrix C belong to one polarization direction; for example, the rows with the reference numbers $\{0, 1, \ldots, L-1\}$ belong to one polarization direction. The rows in the second half of sequence numbers in the first matrix C belong to the other polarization direction; for example, the rows with the reference numbers $\{L, L+1, \ldots, 2L-1\}$ belong to the other polarization direction. The polarization direction of a coefficient in the first matrix C refers to the polarization direction of the row where the coefficient is located in the first matrix C.

The field arrangement may be described as follows: For example, $P_A$ denotes the polarization direction corresponding to the strongest coefficient in the first matrix C; $\{y_0, y_1, \ldots, y_{K_A}\}$ denote the fed-back elements corresponding to the polarization direction $P_A$ in the first matrix C, $\{G_0, G_1, \ldots, G_{K_A}\}$ sequentially denote the fields carrying the amplitudes of the corresponding coefficients, and $\{H_0, H_1, \ldots, H_{K_A}\}$ sequentially denote the fields carrying the phases of the corresponding coefficients; $P_B$ denotes the other polarization direction, $\{z_0, z_1, \ldots, z_{K_B}\}$ elements corresponding to the polarization direction $P_B$ in the first matrix C, $\{G_0^*, G_1, \ldots, G_{K_B},\}$ sequentially denote the fields carrying the amplitudes of the corresponding coefficients, and $\{H_0, H_1, \ldots, H_{K_B}\}$ sequentially denote the fields carrying the phases of the corresponding coefficients.

In one example of the field arrangement, the amplitude field and the phase field of the same coefficient are adjacent to each other, with the field corresponding to the polarization direction corresponding to the strongest coefficient at front and the field corresponding to the other polarization direction at the back, as shown in the following manner:

$\{G_0, H_0, G_1, H_1, \ldots, G_{K_A}, H_{K_A}, G_0^*, H_0^*, G_1^*, H_1^*, \ldots, G_{K_B}^*, H_{K_B}^*,\}$, or $\{H_0, G_0, H_1, G_1, \ldots, H_{K_A}, G_{K_A}, H_0^*, G_0^*, H_1^*, G_1^*, \ldots, H_{K_B}^*, G_{K_B}^*\}$.

In another example, the fields carrying the amplitudes corresponding to the strongest polarization direction is located first, followed by the fields carrying the phases corresponding to the strongest polarization direction, then by the fields carrying the amplitudes corresponding to the other polarization direction, and finally by the fields carrying the phases corresponding to the other polarization direction in the following manner:

$\{G_0, G_1, \ldots, G_{K_A}, H_0, H_1, \ldots, H_{K_A}, G_0^*, G_1^*, \ldots, G_{K_B}^*, H_0^*, H_1^*, \ldots, H_{K_B}^*\}$.

In another arrangement example, the fields carrying the phases corresponding to the strongest polarization direction is located first, followed by the fields carrying the amplitudes corresponding to the strongest polarization direction, then by the fields carrying the phases corresponding to the other polarization direction, and finally by the fields carrying the amplitudes corresponding to the other polarization direction in the following manner: $\{H_0, H_1, \ldots, H_{K_A}, G_0, G_1, \ldots, G_{K_A}, H_0^*, H_1^*, \ldots, H_{K_B}^*, G_0^*, G_1^*, \ldots, G_{K_B}^*\}$.

Such a processing manner enables the field corresponding to the polarization direction corresponding to the strongest coefficient at front, improves the reliability of the transmission of the field corresponding to the polarization direction corresponding to the strongest coefficient, and thus improves the transmission performance of the bit sequences of the uplink control information.

The step in which the second bit sequence is generated based on the second partial field includes the step below.

The second field carrying the domain indicating the position of the strongest coefficient in the first matrix is configured before a seventh field carrying the domain indicating the fed-back elements in the first matrix.

For example, the seventh field carrying the domain indicating the fed-back elements in the first matrix is located closely after the second field carrying the domain indicating the position of the strongest coefficient in the first matrix C.

Alternatively, the seventh field carrying the domain indicating the fed-back elements in the first matrix is located after the second field carrying the domain indicating the position of the strongest coefficient in the first matrix C, with one or more other fields located between the seventh field and the second field.

Such a processing manner enables the field carrying the domain indicating the position of the strongest coefficient in the first matrix C at front and improves the reliability of the transmission of the field carrying the domain indicating the position of the strongest coefficient in the first matrix C. Whether the position of the strongest coefficient is transmitted correctly is also related to whether a receiving side can correctly understand the correspondence relationship between the values of other coefficients and the positions of these coefficients. Accordingly, the position of the strongest coefficient is more important than the values of other coefficients and requires a more reliable transmission compared with the values of other coefficients.

Another manner of indicating the arrangement of at least one field carrying the domain indicating the fed-back elements in the first matrix includes the step below.

At least one field carrying the domain of the fed-back elements in the first matrix is arranged based on the order of the fed-back elements in the first matrix.

For example, the fed-back elements in the first matrix C are $\{q_0, q_1, \ldots, q_{K_C}\}$ based on the order of the coefficients indicated in the first field carrying the domain indicating the information of the second matrix $C_{map}$; the corresponding fields carrying the amplitudes of the coefficients are $\{\overline{G_0}, \overline{G_1}, \ldots, \overline{G_{K_C}}\}$ sequentially; and the corresponding fields carrying the phases of the coefficients are $\{\overline{H_0}, \overline{H_1}, \ldots, \overline{H_{K_C}}\}$ sequentially. Accordingly, the fields carrying the amplitudes of the coefficients and the fields carrying the phases of the coefficients are arranged as $\{\overline{G_0}, \overline{H_0}, \overline{G_1}, \overline{H_1}, \ldots, \overline{G_{K_C}}, \overline{H_{K_C}}\}$, $\{\overline{H_0}, \overline{G_0}, \overline{H_1}, \overline{G_1}, \ldots, \overline{H_{K_C}}, \overline{G_{K_C}}\}$, $\{\overline{G_0}, \overline{G_1}, \ldots, \overline{G_{K_C}}, \overline{H_0}, \overline{H_1}, \ldots, \overline{H_{K_C}}\}$, or $\{\overline{H_0}, \overline{H_1}, \ldots, \overline{H_{K_C}}, \overline{G_0}, \overline{G_1}, \overline{G_{K_C}}\}$.

It is to be noted that fields in the second partial field are arranged adjacently and sequentially with no other field between two adjacent fields to form the second bit sequence.

For example, the fields carrying the preceding information domains are arranged as follows: {the field carrying the domain indicating the information of the bit matrix $C_{map}$, the field carrying the domain indicating the strongest position of the coefficient in the first matrix C, the field carrying the domain indicating the reference amplitude of the second polarization direction, the field carrying the domain indicating a coefficient amplitude in the first matrix C, the field carrying the domain indicating a coefficient phase in the matrix C}.

Another field arrangement manner may be as follows: {the field carrying the domain indicating the information of the bit second matrix $C_{map}$, the field carrying the domain indicating the strongest position of the coefficient in the first matrix C, the field carrying the domain indicating the reference amplitude of the second polarization direction, the field carrying the domain indicating a coefficient phase in the first matrix C, the field carrying the domain indicating a coefficient amplitude in the first matrix C}.

Based on the preceding scheme, an example of constituting the first bit sequence and the second bit sequence is provided hereinafter.

The first partial field is sequentially connected to form the first bit sequence, for example, {the field carrying the domain indicating a rank of precoding, the field carrying the domain indicating a wideband channel quality indicator (CQI) of a first transport block (TB), the field carrying the domain indicating a subband differential channel quality indicator (CQI) of the first transport block (TB), the field indicating the number of the fed-back elements in the matrix C}.

The second partial field is sequentially connected to form the second bit sequence, for example, {the field carrying the domain indicating the information of the second matrix $C_{map}$, the field carrying the domain indicating the strongest position of the coefficient in the first matrix C, the field carrying the domain indicating the reference amplitude of the second polarization direction, the field carrying the domain indicating a coefficient amplitude in the matrix C, the field carrying the domain indicating a coefficient phase in the matrix C}, or {the field carrying the domain indicating the information of the bit matrix $C_{map}$, the carrying the domain indicating the strongest position of the coefficient in the matrix C, the field carrying the domain indicating the reference amplitude of the second polarization direction, the field carrying the domain indicating a coefficient phase in the matrix C, the field carrying the domain indicating a coefficient amplitude in the matrix C}.

The step in which the second bit sequence is generated based on the second partial field further includes the step of arranging the fields carrying the precoding information of each layer based on the order of precoding layers.

For example, the rank of the precoding is 2; that is, the precoding has two layers in total, that is, {layer 1 precoding, layer 2 precoding}; and a field of each layer is arranged based on the order of the precoding layers as follows: {the field carrying layer 1 precoding information, the field carrying layer 2 precoding information}. In another example, the rank of the precoding is 3; that is, the precoding has three layers in total, that is, {layer 1 precoding, layer 2 precoding, layer 3 precoding}; and a field of each layer is arranged based on the order of the precoding layers as follows: {the field carrying layer 1 precoding information, the field carrying layer 2 precoding information, the field carrying layer 3 precoding information}. In another example, the rank of the precoding is 4; that is, the precoding has four layers in total, that is, {layer 1 precoding, layer 2 precoding, layer 3 precoding, layer 4 precoding}; a field of each layer is arranged based on the order of the precoding layers as follows: {the field carrying layer 1 precoding information, the field carrying layer 2 precoding information, the field carrying layer 3 precoding information, the field carrying layer 4 precoding information}.

The step in which the first bit sequence is generated based on the first partial field further includes the step in which a field carrying the domain indicating the number of the fed-back elements in the first matrix is configured at the front of the first partial field.

For example, {the field carrying the domain indicating the number of the fed-back elements in the first matrix, the field carrying the domain indicating a wideband channel quality indicator of the first transport block, the field carrying the domain indicating a subband differential channel quality indicator of the first transport block}.

In another example, {the field carrying the domain indicating the number of the fed-back elements in the first matrix, the field carrying the domain indicating a rank of precoding, the field carrying the domain indicating a wideband channel quality indicator of the first transport block, the field carrying the domain indicating a subband differential channel quality indicator of the first transport block}.

A network device, for example, a base station, needs to know the information about the number of the fed-back elements in the first matrix so as to determine the length of the second bit sequence, thus receiving the second bit sequence correctly and interpreting the information therein. Accordingly, a field carrying the domain indicating the number of the fed-back elements in the first matrix is of great importance; the arrangement in which a field carrying the domain indicating the number of the fed-back elements in the first matrix is located at the front of the first partial field may improve the transmission reliability of the field and thus improve the transmission reliability of the uplink control information.

The method further includes the step in which the number of fields carrying the domain indicating the number of the fed-back elements in the first matrix is determined based on the maximum value of the rank configured by a base station for a terminal device.

For example, as configured by the base station for the terminal device, the maximum value of the rank of the precoding to be fed back is 1; the number of fields carrying the domain indicating the number of the fed-back elements in the first matrix is 1; and each field carries a domain corresponding to one layer of the precoding and indicating the number of the fed-back elements in the first matrix.

In another example, as configured by the base station for the terminal device, the maximum value of the rank of the precoding to be fed back is 2; the number of fields carrying the domain indicating the number of the fed-back elements in the first matrix is 2; and each field carries a domain corresponding to one layer of the precoding and indicating the number of the fed-back elements in the first matrix. For example, the first field carries the domain corresponding to layer 1 precoding and indicating the number of the fed-back elements in the first matrix, and the second field carries the domain corresponding to layer 2 precoding and indicating the number of the fed-back elements in the first matrix.

In another example, as configured by the base station for the terminal device, the maximum value of the rank of the precoding to be fed back is 3; the number of fields carrying the domain indicating the number of the fed-back elements in the first matrix is 3; and each field carries a domain corresponding to one layer of the precoding and indicating the number of the fed-back elements in the first matrix. For example, the first field carries the domain corresponding to layer 1 precoding and indicating the number of the fed-back elements in the first matrix, the second field carries the domain corresponding to layer 2 precoding and indicating the number of the fed-back elements in the first matrix, and the third field carries the domain corresponding to layer 3 precoding and indicating the number of the fed-back elements in the first matrix.

In another example, as configured by the base station for the terminal device, the maximum value of the rank of the precoding to be fed back is 4; the number of fields carrying the domain indicating the number of the fed-back elements in the first matrix is 4; and each field carries a domain corresponding to one layer of the precoding and indicating the number of the fed-back elements in the first matrix. For example, the first field carries the domain corresponding to layer 1 precoding and indicating the number of the fed-back elements in the first matrix, the second field carries the domain corresponding to layer 2 precoding and indicating the number of the fed-back elements in the first matrix, the third field carries the domain corresponding to layer 3 precoding and indicating the number of the fed-back elements in the first matrix, and the fourth field carries the domain corresponding to layer 4 precoding and indicating the number of the fed-back elements in the first matrix.

The step in which the number of fields carrying the domain indicating the number of the fed-back elements in the first matrix is determined based on the maximum value of the rank configured by a base station for a terminal device further includes the step in which the fed-back rank of the precoding is indicated based on the number of fields carrying the number of non-zero values.

For example, as configured by the base station for the terminal device, the maximum value of the rank of the precoding to be fed back is P; the number of fields carrying the domain indicating the number of the fed-back elements in the first matrix is P; and each field carries a domain belonging to one layer of the precoding and indicating the number of the fed-back elements in the first matrix.

Here when the numbers carried by Q fields are non-zero, it indicates that the fed-back rank of the precoding is Q; and P and Q are positive integers.

It can be seen that through the preceding embodiment, one or more information domains of the channel state information are mapped to the uplink control information, specifically, to a first partial field and a second partial field that are in the uplink control information; moreover, a first bit sequence and a second bit sequence are formed by the first partial field and the second partial field respectively. In this case, the channel state information is mapped to the uplink control information.

Additionally, since the preceding embodiment further provides that the domain indicating the position of the strongest coefficient in the first matrix is mapped to a sequence consisting of N bits, the complexity of calculating the position of the strongest element in the first matrix is reduced. Moreover, the arrangement in which the field corresponding to the fed-back elements belonging to the first polarization direction locating the strongest element is located before the sixth field corresponding to the fed-back elements belonging to the second polarization direction guarantees the reliability of information transmission.

Figure 3:
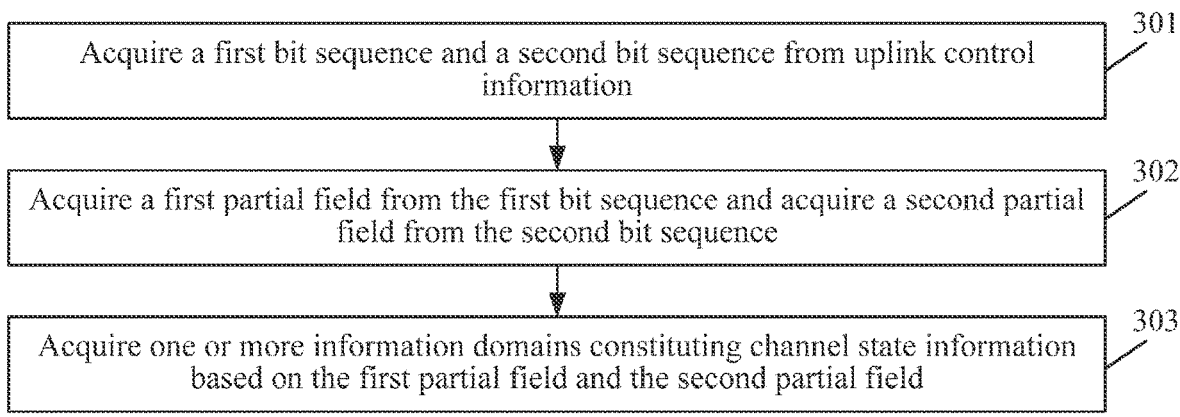
FIG. 3 is a flowchart of an information acquisition method according to an embodiment of the present application.

In another exemplary embodiment, an information acquisition method is provided, as shown in FIG. 3. The method includes the steps below.

In step 301, a first bit sequence and a second bit sequence are acquired from uplink control information.

In step 302, a first partial field is acquired from the first bit sequence, and a second partial field is acquired from the second bit sequence.

In step 303, one or more information domains constituting channel state information are acquired based on the first partial field and the second partial field.

The first partial field is used for carrying at least one of the following information domains of the channel state information: a domain indicating a rank of precoding, a domain indicating a wideband channel quality indicator of a first transport block, a domain indicating a subband differential channel quality indicator of the first transport block, or a domain indicating the number of fed-back elements in a first matrix.

The second partial field is used for carrying at least one of the following information domains of the channel state information: a domain indicating the information of a second matrix, a domain indicating the position of the strongest coefficient in the first matrix, a domain indicating the reference amplitude of a second polarization direction, or a domain indicating the fed-back elements in the first matrix; and the domain indicating the fed-back elements in the first matrix includes a domain indicating amplitudes of the fed-back elements in the first matrix and a domain indicating phases of the fed-back elements in the first matrix.

Elements in the second matrix are used for indicating positions of the fed-back elements in the first matrix.

This embodiment applies to a network device. The network device may be a device in the network, for example, specifically, a base station in the network.

Figure 4:
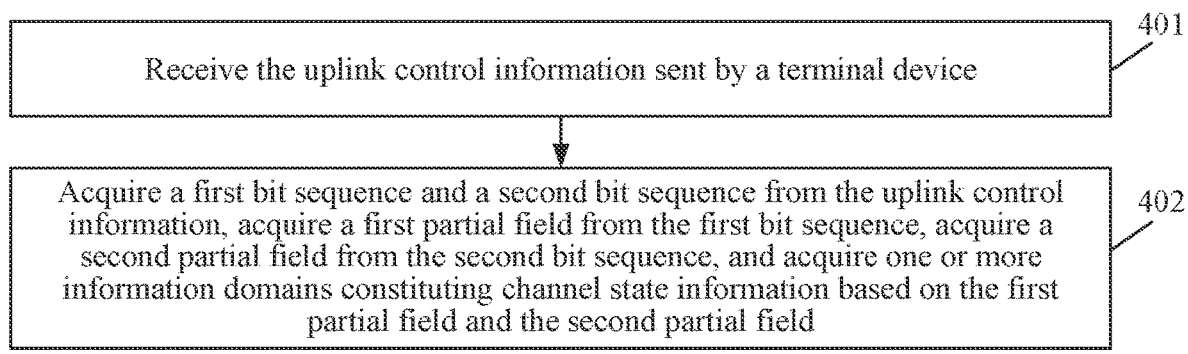
FIG. 4 is a flowchart of an information acquisition method according to another embodiment of the present application.

Referring to FIG. 4, this embodiment may include the processing flow below.

In step 401, the uplink control information sent by a terminal device is received.

In step 402, a first bit sequence and a second bit sequence are acquired from the uplink control information: a first partial field is acquired from the first bit sequence, and a second partial field is acquired from the second bit sequence; and one or more information domains constituting channel state information are acquired based on the first partial field and the second partial field.

The constitution manner of precoding involved in this embodiment is the same as the preceding embodiment and is not repeated here.

In the preceding processing flow, the step in which the one or more information domains constituting the channel state information are acquired based on the first partial field and the second partial field includes the step below.

Two-dimensional matrix elements constituting a second matrix are determined based on a one-dimensional sequence included in a first field included in the second partial field.

It is to be noted that the processing of converting a one-dimensional sequence to a two-dimensional matrix may be determined based on the number of rows of the second matrix and the number of columns of the second matrix. The number of elements to be acquired from the one-dimensional sequence to form the elements in each row of the second matrix is determined sequentially; then the acquired elements are added to the two-dimensional matrix based on the ascending order of the rows to acquire the second matrix.

For example, a one-dimensional sequence is that $X_c=[x_0, x_1, \ldots, x_{2LM-1}]$. Elements 0 to M−1 are taken as elements in the first row of the second matrix; in this manner, based on the ascending order of the rows, the second matrix of 2L rows and M columns is recovered and acquired.

The processing of converting a one-dimensional sequence to a two-dimensional matrix in this embodiment is contrary to the processing rule of mapping a two-dimensional matrix to a one-dimensional sequence in the preceding embodiment. Accordingly, the specific processing is not repeated.

The step in which the one or more information domains constituting the channel state information are acquired based on the first partial field and the second partial field includes the step below.

The position of the strongest coefficient in the first matrix is determined based on a sequence consisting of N bits included in a second field in the second partial field. Here N is an integer and is related to the maximum number of fed-back elements.

As for a sequence consisting of N bits, the determination of N is related to the maximum number of fed-back elements; for example, N may be determined based on the formula that $\lceil \log_2(K_0) \rceil$.

$K_0$ denotes the maximum possible number of the fed-back elements in the first matrix C that are configured by a base station for a terminal.

It is to be noted that the coefficients in the first matrix C are the elements in the first matrix C, and the coefficients refer to the coefficients of the columns in the matrix V and the coefficients of the rows in the matrix U. That is, the position of the strongest coefficient in the matrix C is the same as the position of the strongest element in the matrix C. The position of the strongest coefficient in the matrix C is (l*, m*), where l* denotes the reference number of the row where the strongest coefficient in the matrix C is located, and m* denotes the reference number of the column where the strongest coefficient in the matrix C is located. The strongest coefficient in the matrix C is only possible in the position of an element of the first matrix C indicated by the second matrix $C_{map}$. That is, it exists $K_0$ possible positions at most. A field sequence of $\lceil \log_2(K_0) \rceil$ bits is used for mapping one of the $K_0$ possible positions so that the overhead may be saved to the maximum extent.

For example, the correspondence relationship between the positions indicated in the field of the second matrix $C_{map}$ and the sequence states with the sequences constituted by $\lceil \log_2(K_0) \rceil$ bits is a first correspondence relationship. Based on the first correspondence relationship, $\lceil \log_2(K_0) \rceil$ bits are used for indicating the position of the strongest coefficient in the first matrix C. Alternatively, the correspondence relationship between the positions indicated in the field of the second matrix $C_{map}$ and the sequence states with the sequences constituted by $\lceil \log_2(K_0) \rceil$ bits is a second correspondence relationship. Based on the second correspondence relationship, $\lceil \log_2(K_0) \rceil$ bits are used for indicating the position of the strongest coefficient in the first matrix C.

Specifically, the first correspondence relationship is that the positions indicated in the field of the second matrix $C_{map}$ sequentially correspond to the sequence states. For example, position 1 in the second matrix $C_{map}$ corresponds to the sequence state 0 with the sequence constituted by $\lceil \log_2(K_0) \rceil$ bits; then the indicated positions in ascending order correspond to the bit sequences in ascending order. For example, $K_1$ positions are indicated in the field of $C_{map}$.

Here {Position 1, position 2, ..., position $K_1$} sequentially correspond to {sequence state 0, sequence state 1, ..., sequence state $K_1-1$} in a one-to-one manner. The sequence state n indicates that n denotes the numeral constituted by a sequence. For example, the bit sequence 001 whose lowest bit is on the right constitutes a numeral 1; the bit sequence 010 whose lowest bit is on the right constitutes a numeral 2; the bit sequence 100 whose lowest bit is on the right constitutes a numeral 4; the bit sequence 001 whose lowest bit is on the left constitutes a numeral 4; the bit sequence 010 whose lowest bit is on the left constitutes a numeral 2; and the bit sequence 100 whose lowest bit is on the left constitutes a numeral 1.

A sequence of N bits is used for indicating a position. For example, when a sequence state is 3 and the positions in the second matrix correspond to the sequence states from front to back in a one-to-one manner, this sequence state indicates position 4 in the second matrix. Then the strongest element in the first matrix is determined based on the element in position 4 in the second matrix.

Such arrangement in which the correspondence is performed based on the order of the positions indicated in the field of the second matrix $C_{map}$ can reduce the complexity of calculating the position of the strongest element in the first matrix C; the relationship in which the ascending order of the positions indicated in the field of the second matrix $C_{map}$ corresponds to the ascending order of the sequence states can reduce the complexity of calculating the position of the strongest element in the first matrix C; and the relationship in which the position 1 indicated in the field of the second matrix $C_{map}$ corresponds to the sequence state 0 can reduce the complexity of calculating the position of the strongest element in the first matrix C.

The second correspondence relationship is that position 1 indicated in the field of the second matrix $C_{map}$ corresponds to the sequence state ($2^b-1$) with the sequence constituted by $\lceil \log_2(K_0) \rceil$ bits; then the indicated positions in ascending order correspond to bit sequences in descending order. For example, $K_1$ positions are indicated in the field of the second matrix $C_{map}$; and here {position 1, position 2, ..., position $K_1$} sequentially correspond to {sequence state $2^b-1$, sequence state $2^b-2$, ..., sequence state $2^b-K_1$} in a one-to-one manner, where $\lceil \log_2(K_0) \rceil$. The sequence state n indicates that n denotes the numeral constituted by a sequence. For example, the bit sequence 001 whose lowest bit is on the right constitutes a numeral 1; the bit sequence 010 whose lowest bit is on the right constitutes a numeral 2; the bit sequence 100 whose lowest bit is on the right constitutes a numeral 4; the bit sequence 001 whose lowest bit is on the left constitutes a numeral 4; the bit sequence 010 whose lowest bit is on the left constitutes a numeral 2; and the bit sequence 100 whose lowest bit is on the left constitutes a numeral 1.

Similarly, such arrangement in which the correspondence is performed based on the order of the positions indicated in the field of the second matrix $C_{map}$ can reduce the complexity of calculating the position of the strongest element in the first matrix C; the relationship in which the ascending order of the positions indicated in the field of the second matrix $C_{map}$ corresponds to the descending order of the sequence states can reduce the complexity of calculating the position of the strongest element in the first matrix C; and the relationship in which the position 1 indicated in the field of the second matrix $C_{map}$ corresponds to the last sequence state can reduce the complexity of calculating the position of the strongest element in the first matrix C.

The step in which the one or more information domains constituting the channel state information are acquired based on the first partial field and the second partial field includes the step below.

The information of the second matrix is determined based on a first field in the second partial field.

The position of the strongest coefficient in the first matrix is determined based on a second field located after the first field in the second partial field.

Here the second field includes a sequence consisting of N bits, and N is an integer and is related to the maximum number of fed-back elements configured by a network device.

The manner of determining the sequence constituted by N bits included in the second field is as described above and is not repeated here.

The field carrying the domain indicating the information of the second matrix $C_{map}$ is relatively important since the acquisition of the position of the strongest coefficient in the first matrix C based on the field carrying the domain indicating the position of the strongest coefficient in the first matrix C needs to be dependent on the information of the second matrix $C_{map}$. In a bit sequence of the uplink control information, a field located at front is more reliable than a field located at the back.

For example, the second field carrying the domain indicating the position of the strongest coefficient in the first matrix C is located closely after the first field carrying the domain indicating the information of the second matrix $C_{map}$; alternatively, after the first field carrying the domain indicating the information of the second matrix $C_{map}$, one or more other fields follow, and then the second field carrying the domain indicating the position of the strongest coefficient in the first matrix C is added.

Further, the information of the second matrix is determined based on the first field, and the position of the strongest coefficient in the first matrix is determined based on the second field. The manner of determining the position of the strongest coefficient based on the content of the second field may be as described above and is not repeated here.

The step in which the one or more information domains constituting the channel state information are acquired based on the first partial field and the second partial field includes the step below.

A coefficient amplitude and a coefficient phase corresponding to a coefficient in the first matrix are determined based on a third field and a fourth field that are adjacent to each other in the second partial field.

The third field and the fourth field are adjacent to each other, with no other field in between. That is, when the third field is acquired from the second partial field, it can be determined that the field adjacent to the third field is the fourth field, thus acquiring the coefficient amplitude and the coefficient phase that correspond to the coefficient in the first matrix.

For example, y denotes a fed-back and reported coefficient in the first matrix C; $A_y$ denotes the amplitude of y; $G_y$ denotes the field carrying $A_y$; $P_y$ denotes the phase of y; and $H_y$ denotes the field carrying $P_y$. In the second bit sequence, the field $G_y$ is closely adjacent to the field $H_y$ with no other field in between; for example, the two fields are arranged as $G_y H_y$ or $H_y G_y$.

In another example, z denotes another fed-back and reported coefficient in the first matrix C; $A_z$ denotes the amplitude of z. $G_z$ denotes the field carrying $A_z$; $P_z$ denotes the phase of z; and $H_z$ denotes the field carrying $P_z$. The fields carrying the amplitudes of the two coefficients and the fields carrying the phases of the two coefficients are arranged as $G_y H_y G_z H_z$, $H_y G_y H_z G_z$, $G_z H_z G_y H_y$, or $H_z G_z H_y G_y$; $G_y$ is closely adjacent to $H_y$ with no other field in between; and $G_z$ is closely adjacent to $H_z$ with no other field in between.

In this case, the arrangement in which the field carrying the amplitude of a coefficient is closely adjacent to the field carrying the phase of the coefficient can shorten the time for acquiring the coefficient. The acquired coefficient can be used without waiting for the acquisition of other coefficients; that is, the time of waiting for using the coefficient can be shortened.

The step in which the one or more information domains constituting the channel state information are acquired based on the first partial field and the second partial field includes the step below.

Fed-back elements corresponding to a first polarization direction in the first matrix are determined based on a fifth field in the second partial field.

Fed-back elements corresponding to the second polarization direction are determined based on a sixth field located after the fifth field in the second partial field.

Here the first polarization direction is a polarization direction corresponding to the strongest coefficient in the first matrix, and the second polarization direction is a polarization direction different from the first polarization direction.

That is, the fifth field and the sixth field are acquired from the second partial field; based on a preset arrangement rule, it is determined that the fifth field located at front is for the fed-back elements corresponding to the first polarization direction and the sixth field is for the fed-back elements corresponding to the second polarization direction.

The field arrangement rule may be described as follows: $P_A$ denotes the polarization direction corresponding to the strongest coefficient in the first matrix C, the fifth field includes the fed-back elements $\{y_0, y_1, \ldots, y_{K_A}\}$ corresponding to the polarization direction $P_A$ in the first matrix C, $\{G_0, G_1, \ldots, G_{K_A}\}$ sequentially denote the fields carrying the amplitudes of the corresponding coefficients, and $\{H_0, H_1, \ldots, H_{K_A}\}$ sequentially denote the fields carrying the phases of the corresponding coefficients; $P_B$ denotes the other polarization direction, the sixth field includes the fed-back elements $\{z_0, z_1, \ldots, z_{K_B}\}$ corresponding to the polarization direction $P_B$ in the first matrix C, $\{G_0^*, G_1^*, \ldots, G_{K_B}^*,\}$ sequentially denote the fields carrying the amplitudes of the corresponding coefficients, and $\{H_0^*, H_1^*, \ldots, H_{K_B}^*\}$ sequentially denote the fields carrying the phases of the corresponding coefficients.

In one example of the field arrangement, the amplitude field and the phase field of the same coefficient are adjacent to each other, with the field corresponding to the polarization direction corresponding to the strongest coefficient at front and the field corresponding to the other polarization direction at the back, as shown in the following manner:

$\{G_0, H_0, G_1, H_1, \ldots, G_{K_A}, H_{K_A}, G_0^*, H_0^*, G_1^*, H_1^*, \ldots, G_{K_B}^*, H_{K_B}^*,\}$, or $\{H_0, G_0, H_1, G_1, \ldots, H_{K_A}, G_{K_A}, H_0^*, G_0^*, H_1^*, G_1^*, \ldots, H_{K_B}^*, G_{K_B}^*\}$.

With this arrangement, in the case of a network device performs parsing, the amplitude and phase of a coefficient corresponding to each of the two polarization directions may be acquired sequentially based on such a rule; then the amplitude and phase of the next coefficient are acquired; finally, the amplitude and phase of each coefficient are acquired.

In another example, the fields carrying the amplitudes corresponding to the strongest polarization direction is located first, followed by the fields carrying the phases corresponding to the strongest polarization direction, then by the fields carrying the amplitudes corresponding to the other polarization direction, and finally by the fields carrying the phases corresponding to the other polarization direction in the following manner:

$\{G_0, G_1, \ldots, G_{K_A}, H_0, H_1, \ldots, H_{K_A}, G_0^*, G_1^*, \ldots, G_{K_B}^*, H_0^*, H_1^*, \ldots, H_{K_B}^*\}$.

Correspondingly, a network device acquires amplitude fields and phase fields are acquired sequentially based on such an arrangement rule. For example, K elements as the coefficient amplitudes corresponding to the first polarization direction are acquired; then K elements as the coefficient phases corresponding to the first polarization direction are acquired; then K elements as the coefficient amplitudes corresponding to the second polarization direction are acquired; finally, K elements as the coefficient phases corresponding to the second polarization direction are acquired.

In another arrangement example, the fields carrying the phases corresponding to the strongest polarization direction is located first, followed by the fields carrying the amplitudes corresponding to the strongest polarization direction, then by the fields carrying the phases corresponding to the other polarization direction, and finally by the fields carrying the amplitudes corresponding to the other polarization direction in the following manner: $\{H_0, H_1, \ldots, H_{K_A}, G_0, G_1, \ldots, G_{K_A}, H_0^*, H_1^*, \ldots, H_{K_B}^*, G_0^*, G_1^*, \ldots, G_{K_B}^*\}$. Correspondingly, a network device acquires amplitude fields and phase fields are acquired sequentially based on such an arrangement rule.

For example, K elements as the coefficient phases corresponding to the first polarization direction are acquired; then K elements as the coefficient amplitudes corresponding to the first polarization direction are acquired; then K elements as the coefficient phases corresponding to the second polarization direction are acquired; finally, K elements as the coefficient amplitudes corresponding to the second polarization direction are acquired.

Such a processing manner enables the field corresponding to the polarization direction corresponding to the strongest coefficient at front, improves the reliability of the transmission of the field corresponding to the polarization direction corresponding to the strongest coefficient, and thus guarantees the transmission performance of the bit sequences of the uplink control information.

The step in which the one or more information domains constituting the channel state information are acquired based on the first partial field and the second partial field includes the step below.

The position of the strongest coefficient in the first matrix is determined based on the second field.

The fed-back elements in the first matrix are determined based on a seventh field located after the second field.

For example, after the second field is acquired to acquire the position of the strongest coefficient in the first matrix, the seventh field follows the second field closely; and the fed-back elements in the first matrix C are acquired from the seventh field.

Alternatively, after the second field is acquired to acquire the position of the strongest coefficient in the first matrix, the seventh field located after a preset number of adjacent fields is acquired; and the fed-back elements in the first matrix C are acquired from the seventh field. Here the preset number may be acquired through a pre-negotiation with the terminal device or determined by both parties according to a protocol. For example, three fields may be located between the second field and the seventh field; alternatively, more than three fields or less than three fields may be located between the second field and the seventh field. This is not exhaustive in this embodiment.

As for another arrangement manner of the fields indicating the fed-back elements in the first matrix, the step in which the one or more information domains constituting the channel state information are acquired based on the first partial field and the second partial field includes the step below.

The second matrix is determined based on the first field; and at least one field carrying the domain of the fed-back elements in the first matrix is determined based on the order of the fed-back elements in the first matrix, with the order indicated by the second matrix.

The fed-back elements in the first matrix are determined based on the at least one field.

For example, the second matrix is first acquired from the first field, and then at least one field carrying the domain of the fed-back elements is acquired. The fed-back elements in the first matrix C are $\{q_0, q_1, \ldots, q_{K_C}\}$ based on the order of the coefficients indicated in the first field carrying the domain indicating the information of the second matrix $C_{map}$; the corresponding fields carrying the amplitudes of the coefficients are $\{\overline{G}_0, \overline{G}_1, \ldots, \overline{G}_{K_C}\}$ sequentially; and the corresponding fields carrying the phases of the coefficients are $\{\overline{H}_0, \overline{H}_1, \ldots, \overline{H}_{K_C}\}$ sequentially. Accordingly, the fields carrying the amplitudes of the coefficients and the fields carrying the phases of the coefficients are arranged as $\{\overline{G}_0, \overline{H}_0, \overline{G}_1, \overline{H}_1, \ldots, \overline{G}_{K_C}, \overline{H}_{K_C}\}$, $\{\overline{H}_0, \overline{G}_0, \overline{H}_1, \overline{G}_1, \ldots, \overline{H}_{K_C}, \overline{G}_{K_C}\}$, $\{\overline{G}_0, \overline{G}_1, \ldots, \overline{G}_{K_C}, \overline{H}_0, \overline{H}_1, \ldots, \overline{H}_{K_C}\}$, or $\{\overline{H}_0, \overline{H}_1, \ldots, \overline{H}_{K_C}, \overline{G}_0, \overline{G}_1, \ldots, \overline{G}_{K_C}\}$.

Based on the preceding scheme, based on a preset arrangement order of fields in the first bit sequence and a preset arrangement order of fields in the second bit sequence, a network device may determine to which domain in the channel state information an acquired field corresponds. The preset arrangement order of fields in the first bit sequence and the preset arrangement order of fields in the second bit sequence may be determined by a protocol or may be acquired through a negotiation with a terminal device. One example of the preset arrangement order of fields in the first bit sequence and the preset arrangement order of fields in the second bit sequence is provided hereinafter.

The first partial field is sequentially connected to form the first bit sequence, for example, {the field carrying the domain indicating a rank of precoding, the field carrying the domain indicating a wideband channel quality indicator (CQI) of a first transport block (TB), the field carrying the domain indicating a subband differential channel quality indicator (CQI) of the first transport block (TB), the field indicating the number of the fed-back elements in the matrix C}.

The second partial field is sequentially connected to form the second bit sequence, for example, {the field carrying the domain indicating the information of the second matrix $C_{map}$, the field carrying the domain indicating the strongest position of the coefficient in the first matrix C, the field carrying the domain indicating the reference amplitude of the second polarization direction, the field carrying the domain indicating a coefficient amplitude in the matrix C, the field carrying the domain indicating a coefficient phase in the matrix C}, or {the field carrying the domain indicating the information of the bit matrix $C_{map}$, the carrying the domain indicating the strongest position of the coefficient in the matrix C, the field carrying the domain indicating the reference amplitude of the second polarization direction, the field carrying the domain indicating a coefficient phase in the matrix C, the field carrying the domain indicating a coefficient amplitude in the matrix C}.

The first partial field is acquired from the first bit sequence and the second partial field is acquired from the second bit sequence; the one or more information domains constituting the channel state information are acquired based on the first partial field and the second partial field; here in the second bit sequence, a field carrying the precoding information of each layer is arranged based on the order of the precoding layers.

For example, the rank of the precoding is 2; that is, the precoding has two layers in total, that is, {layer 1 precoding, layer 2 precoding}; and a field of each layer is arranged based on the order of the precoding layers as follows: {the field carrying layer 1 precoding information, the field carrying layer 2 precoding information}. In another example, the rank of the precoding is 3; that is, the precoding has three layers in total, that is, {layer 1 precoding, layer 2 precoding, layer 3 precoding}; and a field of each layer is arranged based on the order of the precoding layers as follows: {the field carrying layer 1 precoding information, the field carrying layer 2 precoding information, the field carrying layer 3 precoding information}. In another example, the rank of the precoding is 4; that is, the precoding has four layers in total, that is, {layer 1 precoding, layer 2 precoding, layer 3 precoding, layer 4 precoding}; a field of each layer is arranged based on the order of the precoding layers as follows: {the field carrying layer 1 precoding information, the field carrying layer 2 precoding information, the field carrying layer 3 precoding information, the field carrying layer 4 precoding information}.

The step in which the first partial field is acquired from the first bit sequence may include the step in which a field carrying the domain indicating the number of the fed-back elements in the first matrix is acquired from the front of the first partial field in the first bit sequence.

Here in the first bit sequence, a field carrying the domain indicating the number of the fed-back elements in the first matrix is located at the front of the first partial field.

For example, {the field carrying the domain indicating the number of the fed-back elements in the first matrix, the field carrying the domain indicating a wideband channel quality indicator of the first transport block, the field carrying the domain indicating a subband differential channel quality indicator of the first transport block}.

In another example, {the field carrying the domain indicating the number of the fed-back elements in the first matrix, the field carrying the domain indicating a rank of precoding, the field carrying the domain indicating a wideband channel quality indicator of the first transport block, the field carrying the domain indicating a subband differential channel quality indicator of the first transport block}.

A base station needs to know the information about the number of the fed-back elements in the first matrix so as to determine the length of the second bit sequence, thus receiving the second bit sequence correctly and interpreting the information therein. Accordingly, the field carrying the domain indicating the number of the fed-back elements in the first matrix is of great importance;

the arrangement in which a field carrying the domain indicating the number of the fed-back elements in the first matrix is located at the front of the first partial field may improve the transmission reliability of the field and thus improve the transmission reliability of the uplink control information.

The first partial field is acquired from the first bit sequence; the one or more information domains constituting the channel state information are acquired based on the first partial field and the second partial field; here the number of fields carrying the domain indicating the number of the fed-back elements in the first matrix is determined based on the maximum value of the rank configured by a base station for a terminal device.

For example, as configured by the base station for the terminal device, the maximum value of the rank of the precoding to be fed back is 1; the number of fields carrying the domain indicating the number of the fed-back elements in the first matrix is 1; and each field carries a domain corresponding to one layer of the precoding and indicating the number of the fed-back elements in the first matrix.

In another example, as configured by the base station for the terminal device, the maximum value of the rank of the precoding to be fed back is 2; the number of fields carrying the domain indicating the number of the fed-back elements in the first matrix is 2; and each field carries a domain corresponding to one layer of the precoding and indicating the number of the fed-back elements in the first matrix. For example, the first field carries the domain corresponding to layer 1 precoding and indicating the number of the fed-back elements in the first matrix, and the second field carries the domain corresponding to layer 2 precoding and indicating the number of the fed-back elements in the first matrix.

In another example, as configured by the base station for the terminal device, the maximum value of the rank of the precoding to be fed back is 3; the number of fields carrying the domain indicating the number of the fed-back elements in the first matrix is 3; and each field carries a domain corresponding to one layer of the precoding and indicating the number of the fed-back elements in the first matrix. For example, the first field carries the domain corresponding to layer 1 precoding and indicating the number of the fed-back elements in the first matrix, the second field carries the domain corresponding to layer 2 precoding and indicating the number of the fed-back elements in the first matrix, and the third field carries the domain corresponding to layer 3 precoding and indicating the number of the fed-back elements in the first matrix.

In another example, as configured by the base station for the terminal device, the maximum value of the rank of the precoding to be fed back is 4; the number of fields carrying the domain indicating the number of the fed-back elements in the first matrix is 4; and each field carries a domain corresponding to one layer of the precoding and indicating the number of the fed-back elements in the first matrix. For example, the first field carries the domain corresponding to layer 1 precoding and indicating the number of the fed-back elements in the first matrix, the second field carries the domain corresponding to layer 2 precoding and indicating the number of the fed-back elements in the first matrix, the third field carries the domain corresponding to layer 3 precoding and indicating the number of the fed-back elements in the first matrix, and the fourth field carries the domain corresponding to layer 4 precoding and indicating the number of the fed-back elements in the first matrix.

The step in which the number of fields carrying the domain indicating the number of the fed-back elements in the first matrix is determined based on the maximum value of the rank configured by a base station for a terminal device further includes the step in which the fed-back rank of the precoding is determined based on the number of fields carrying the number of non-zero values.

For example, as configured by the base station for the terminal device, the maximum value of the rank of the precoding to be fed back is P; the number of fields carrying the domain indicating the number of the fed-back elements in the first matrix is P; and each field carries a domain belonging to one layer of the precoding and indicating the number of the fed-back elements in the first matrix. Here when the numbers carried by Q fields are non-zero, it determines that the fed-back rank of the precoding is Q; and P and Q are positive integers.

It can be seen that with the adoption of preceding embodiments, the one or more information domains of the channel state information are acquired based on the uplink control information. Specifically, the first bit sequence and the second bit sequence are acquired from the uplink control information; the first partial field is acquired from the first bit sequence, and the second partial field is acquired from the second bit sequence; and the one or more information domains of the channel state information are acquired based on the first partial field and the second partial field. In this case, the channel state information can be acquired based on the uplink control information.

Figure 5:
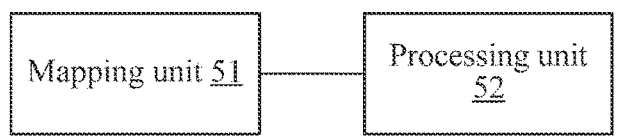
FIG. 5 is a diagram illustrating the structure of a terminal device according to an embodiment of the present application.

In one exemplary embodiment, a terminal device is provided, as shown in FIG. 5. The terminal device includes a mapping unit 51 and a processing unit 52.

The mapping unit 51 is configured to map one or more information domains of channel state information to one or more fields of uplink control information.

The processing unit 52 is configured to divide the one or more fields into a first partial field and a second partial field, to generate a first bit sequence based on the first partial field, and to generate a second bit sequence based on the second partial field.

The first partial field is used for carrying at least one of the following information domains of the channel state information: a domain indicating a rank of precoding, a domain indicating a wideband channel quality indicator of a first transport block, a domain indicating a subband differential channel quality indicator of the first transport block, or a domain indicating the number of fed-back elements in a first matrix.

The second partial field is used for carrying at least one of the following information domains of the channel state information: a domain indicating the information of a second matrix, a domain indicating the position of the strongest coefficient in the first matrix, a domain indicating the reference amplitude of a second polarization direction, or a domain indicating the fed-back elements in the first matrix; and the domain indicating the fed-back elements in the first matrix includes a domain indicating amplitudes of the fed-back elements in the first matrix and a domain indicating phases of the fed-back elements in the first matrix.

Elements in the second matrix are used for indicating positions of the fed-back elements in the first matrix.

This embodiment applies to a terminal device. After the preceding processing is completed, the method may further include a step of sending the uplink control information to a network device. The network device may be a device in the network, for example, specifically, a base station in the network.

Figure 6:
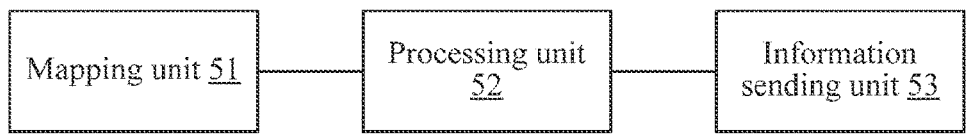
FIG. 6 is a diagram illustrating the structure of a terminal device according to another embodiment of the present application.

Referring to FIG. 6, this embodiment may further include an information sending unit 53 configured to send uplink control information to a network device.

The uplink control information finally sent to the network device is the uplink control information including the first bit sequence and the second bit sequence, that is, the uplink control information to which one or more information domains of the channel state information are mapped.

Refer to the preceding embodiments for the description of the first matrix and the second matrix, which is not repeated here.

A mapping unit 51 is configured to map the domain indicating the information of the second matrix in the channel state information to a first field of the uplink control information. Here the first field includes a one-dimensional sequence, and the one-dimensional sequence is obtained by mapping two-dimensional matrix elements of the second matrix.

It is to be noted here that in this embodiment, the ordinal numerals "first" and "second" in a first field and a second field do not indicate the order of the fields and are only used for distinguishing different fields, thus being irrelevant to the specific arrangement order. For example, the first field may be located before the second field; alternatively, the first field may be located after the second field. Of course, this embodiment may further include more fields, for example, a third field, a fourth field, and a fifth field. The ordinal numerals including "third", "fourth", and "fifth" do not indicate the arrangement order of the fields and are only used for distinguishing one field from another. When the fields are arranged specifically, the arrangement order may be as follows: the first field—the second field—the fourth field—the sixth field—the third field—the fifth field. The arrangement order of the fields in this embodiment is not based on the expression thereof but based on a subsequent rule or description, which is not described repeatedly hereinafter.

Specifically, the mapping may be performed in the manner that the two-dimensional matrix elements are sequentially added to the one-dimensional sequence based on the ascending order of the rows in the second matrix. Finally, the mapped one-dimensional sequence is taken as the first field of the uplink control information.

For example, the second matrix may be that, $$C_{map} = \begin{bmatrix} d_{0,0} & d_{0,1} & \cdots & d_{0,M-1} \\ d_{1,0} & d_{1,1} & \cdots & c_{1,M-1} \\ \vdots & \vdots & \cdots & \vdots \\ d_{2L-1,0} & d_{2L-1,1} & \cdots & d_{2L-1,M-1} \end{bmatrix},$$

which is a two-dimensional bit matrix of 2L rows and M columns; the elements thereof indicate, in the manner of the bitmap, whether the elements in the first matrix where $$C = \begin{bmatrix} c_{0,0} & c_{0,1} & \cdots & c_{0,M-1} \\ c_{1,0} & c_{1,1} & \cdots & c_{1,M-1} \\ \vdots & \vdots & \cdots & \vdots \\ c_{2L-1,0} & c_{2L-1,1} & \cdots & c_{2L-1,M-1} \end{bmatrix}$$

are reported.

The mapping of the second matrix $C_{map}$ to the bit sequence in the field is the mapping of the two-dimensional matrix elements to the one-dimensional sequence. That is, the field mapped by the two-dimensional matrix is a one-dimensional sequence.

That is, the mapped field sequence is that $X_c=[x_0, x_1, \ldots, x_{2LM-1}]$. The mapping of the second matrix $C_{map}$ to the bit sequence in the first field of the uplink control information is performed based on the rows in the second matrix. That is, following all the elements in a row in the second matrix $C_{map}$, all the elements in the next row in the second matrix $C_{map}$ are sequentially mapped to the sequence in the field.

The specific is the same as the processing flow in a preceding manner and is not repeated here.

The mapping unit 51 is configured to map the domain indicating the position of the strongest coefficient in the first matrix in the channel state information to the second field of the uplink control information. Here the second field includes a sequence consisting of N bits, and N is an integer and is related to the maximum number of fed-back elements configured by a network device.

As for a sequence consisting of N bits, the determination of N is related to the maximum number of fed-back elements; for example, N may be determined based on the formula that $\lceil \log_2(K_0) \rceil$.

$K_0$ denotes the maximum possible number of the fed-back elements in the first matrix C that are configured by a base station for a terminal.

It is to be noted that the coefficients in the first matrix C are the elements in the first matrix C, and the coefficients refer to the coefficients of the columns in the matrix V and the coefficients of the rows in the matrix U. That is, the position of the strongest coefficient in the matrix C is the same as the position of the strongest element in the matrix C. The position of the strongest coefficient in the matrix C is (l*, m*), where l* denotes the reference number of the row where the strongest coefficient in the matrix C is located, and m* denotes the reference number of the column where the strongest coefficient in the matrix C is located. The strongest coefficient in the matrix C is only possible in the position of an element of the first matrix C indicated by the second matrix $C_{map}$. That is, it exists $K_0$ possible positions at most. A field sequence of $\lceil \log_2(K_0) \rceil$ bits is used for mapping one of the $K_0$ possible positions so that the overhead may be saved to the maximum extent.

For example, the correspondence relationship between the positions indicated in the field of the second matrix $C_{map}$ and the sequence states with the sequences constituted by $\lceil \log_2(K_0) \rceil$ bits is a first correspondence relationship. Based on the first correspondence relationship, $\lceil \log_2(K_0) \rceil$ bits are used for indicating the position of the strongest coefficient in the first matrix C.

Alternatively, the correspondence relationship between the positions indicated in the field of the second matrix $C_{map}$ and the sequence states with the sequences constituted by $\lceil \log_2(K_0) \rceil$ bits is a second correspondence relationship. Based on the second correspondence relationship, $\lceil \log_2(K_0) \rceil$ bits are used for indicating the position of the strongest coefficient in the first matrix C.

Specifically, the first correspondence relationship is that the positions indicated in the field of the second matrix $C_{map}$ sequentially correspond to the sequence states. For example, position 1 in the second matrix $C_{map}$ corresponds to the sequence state 0 with the sequence constituted by $\lceil \log_2(K_0) \rceil$ bits; then the indicated positions in ascending order correspond to the bit sequences in ascending order. For example, $K_1$ positions are indicated in the field of $C_{map}$.

Here {Position 1, position 2, ..., position $K_1$} sequentially correspond to {sequence state 0, sequence state 1, ..., sequence state $K_1-1$} in a one-to-one manner. The sequence state n indicates that n denotes the numeral constituted by a sequence. For example, the bit sequence 001 whose lowest bit is on the right constitutes a numeral 1; the bit sequence 010 whose lowest bit is on the right constitutes a numeral 2; the bit sequence 100 whose lowest bit is on the right constitutes a numeral 4; the bit sequence 001 whose lowest bit is on the left constitutes a numeral 4; the bit sequence 010 whose lowest bit is on the left constitutes a numeral 2; and the bit sequence 100 whose lowest bit is on the left constitutes a numeral 1.

A sequence of N bits is used for indicating a position. For example, when a sequence state is 3 and the positions in the second matrix correspond to the sequence states from front to back in a one-to-one manner, the sequence state indicates position 4 in the second matrix.

Such arrangement in which the correspondence is performed based on the order of the positions indicated in the field of the second matrix $C_{map}$ can reduce the complexity of calculating the position of the strongest element in the first matrix C; the relationship in which the ascending order of the positions indicated in the field of the second matrix $C_{map}$ corresponds to the ascending order of the sequence states can reduce the complexity of calculating the position of the strongest element in the first matrix C; and the relationship in which the position 1 indicated in the field of the second matrix $C_{map}$ corresponds to the sequence state 0 can reduce the complexity of calculating the position of the strongest element in the first matrix C.

The second correspondence relationship is that position 1 indicated in the field of the second matrix $C_{map}$ corresponds to the sequence state $(2^b-1)$ with the sequence constituted by $\lceil \log_2(K_0) \rceil$ bits; then the indicated positions in ascending order correspond to bit sequences in descending order. For example, $K_1$ positions are indicated in the field of the second matrix $C_{map}$; and here {position 1, position 2, ..., position $K_1$} sequentially correspond to {sequence state $2^b-1$, sequence state $2^b-2$, ..., sequence state $2^b-K_1$} in a one-to-one manner, where $\lceil \log_2(K_0) \rceil$.

The sequence state n indicates that n denotes the numeral constituted by a sequence. For example, the bit sequence 001 whose lowest bit is on the right constitutes a numeral 1; the bit sequence 010 whose lowest bit is on the right constitutes a numeral 2; the bit sequence 100 whose lowest bit is on the right constitutes a numeral 4; the bit sequence 001 whose lowest bit is on the left constitutes a numeral 4; the bit sequence 010 whose lowest bit is on the left constitutes a numeral 2; and the bit sequence 100 whose lowest bit is on the left constitutes a numeral 1.

Similarly, such arrangement in which the correspondence is performed based on the order of the positions indicated in the field of the second matrix $C_{map}$ can reduce the complexity of calculating the position of the strongest element in the first matrix C; the relationship in which the ascending order of the positions indicated in the field of the second matrix $C_{map}$ corresponds to the descending order of the sequence states can reduce the complexity of calculating the position of the strongest element in the first matrix C; and the relationship in which the position 1 indicated in the field of the second matrix $C_{map}$ corresponds to the last sequence state can reduce the complexity of calculating the position of the strongest element in the first matrix C.

It is to be understood that the preceding illustrates only manners of how two information domains in the channel state information are mapped to corresponding fields. Corresponding processing manners are also applicable to other information domains. The content included in an information domain may be directly taken as the specific content of another corresponding field. For example, a coefficient amplitude included in the domain indicating a coefficient amplitude in the first matrix may be directly added to the uplink control information to serve as the third field. Of course, other processing manners may be applied and are not exhaustive here.

The first bit sequence is generated based on the first partial field, and the second bit sequence is generated based on the second partial field. Here as for generating the second bit sequence based on the second partial field, the description is mainly made as below.

The processing unit 52 configures the second field carrying the domain indicating the position of the strongest coefficient in the first matrix after the first field carrying the domain indicating the information of the second matrix. Here the second field includes a sequence consisting of N bits, and N is an integer and is related to the maximum number of fed-back elements configured by a network device.

The manner of determining the sequence constituted by N bits included in the second field is as described above and is not repeated here.

The field carrying the domain indicating the information of the second matrix $C_{map}$ is relatively important since the acquisition of the position of the strongest coefficient in the first matrix C based on the field carrying the domain indicating the position of the strongest coefficient in the first matrix C needs to be dependent on the information of the second matrix $C_{map}$. In a bit sequence of the uplink control information, a field located at front is more reliable than a field located at the back.

For example, the second field carrying the domain indicating the position of the strongest coefficient in the first matrix C is located closely after the first field carrying the domain indicating the information of the second matrix $C_{map}$; alternatively, after the first field carrying the domain indicating the information of the second matrix $C_{map}$, one or more other fields follow, and then the second field carrying the domain indicating the position of the strongest coefficient in the first matrix C is added.

The step in which the second bit sequence is generated based on the second partial field may further include the step in which a third field carrying a domain indicating a coefficient amplitude in the first matrix is configured to be adjacent to a fourth field carrying a domain indicating a coefficient phase in the first matrix, where the third field and the fourth field correspond to the same coefficient in the first matrix.

For example, y denotes a fed-back and reported coefficient in the first matrix C; $A_y$ denotes the amplitude of y; $G_y$ denotes the field carrying $A_y$; $P_y$ denotes the phase of y; and $H_y$ denotes the field carrying $P_y$. In the second bit sequence, the field $G_y$ is closely adjacent to the field $H_y$ with no other field in between; for example, the two fields are arranged as $G_y H_y$ or $H_y G_y$.

In another example, z denotes another fed-back and reported coefficient in the first matrix C; $A_z$ denotes the amplitude of z; $G_z$ denotes the field carrying $A_z$; $P_z$ denotes the phase of z; and $H_z$ denotes the field carrying $P_z$. The fields carrying the amplitudes of the two coefficients and the fields carrying the phases of the two coefficients are arranged as $G_y H_y G_z H_z$, $H_y G_y H_z G_z$, $G_z H_z G_y H_y$, or $H_z G_z H_y G_y$; $G_y$ is closely adjacent to $H_y$ with no other field in between; and $G_z$ is closely adjacent to $H_z$ with no other field in between.

In this case, the arrangement in which the field carrying the amplitude of a coefficient is closely adjacent to the field carrying the phase of the coefficient can shorten the time for acquiring the coefficient. The acquired coefficient can be used without waiting for the acquisition of other coefficients; that is, the time of waiting for using the coefficient can be shortened.

The step in which the second bit sequence is generated based on the second partial field may further include the step below.

The processing unit 52 configures a fifth field carrying fed-back elements corresponding to the first polarization direction in the first matrix before a sixth field carrying fed-back elements corresponding to the second polarization direction in the first matrix. Here the first polarization direction is a polarization direction corresponding to the strongest coefficient in the first matrix, and the second polarization direction is a polarization direction different from the first polarization direction.

The polarization direction of a coefficient in the first matrix C refers to the polarization direction of the column vector that corresponds to the coefficient and is in the matrix V. In this column vector, the element corresponding to the antenna port of the polarization direction is not zero, and the element corresponding to the antenna port of the other polarization direction is zero.

In another aspect, the rows with the first half of sequence numbers in the first matrix C belong to one polarization direction; for example, the rows with the reference numbers $\{0, 1, \ldots, L-1\}$ belong to one polarization direction. The rows in the second half of sequence numbers in the first matrix C belong to the other polarization direction; for example, the rows with the reference numbers $\{L, L+1, \ldots, 2L-1\}$ belong to the other polarization direction. The polarization direction of a coefficient in the first matrix C refers to the polarization direction of the row where the coefficient is located in the first matrix C.

The field arrangement may be described as follows: For example, $P_A$ denotes the polarization direction corresponding to the strongest coefficient in the first matrix C; $\{y_0, y_1, \ldots, y_{K_A}\}$ denote the fed-back elements corresponding to the polarization direction $P_A$ in the first matrix C, $\{G_0, G_1, \ldots, G_{K_A}\}$ sequentially denote the fields carrying the amplitudes of the corresponding coefficients, and $\{H_0, H_1, \ldots, H_{K_A}\}$ sequentially denote the fields carrying the phases of the corresponding coefficients; $P_B$ denotes the other polarization direction, $\{z_0, z_1, \ldots, z_{K_B}\}$ denote the fed-back elements corresponding to the polarization direction $P_B$ in the first matrix C, $\{G_0^*, G_1^*, \ldots, G_{K_B}^*\}$ sequentially denote the fields carrying the amplitudes of the corresponding coefficients, and $\{H_0^*, H_1^*, \ldots, H_{K_B}^*\}$ sequentially denote the fields carrying the phases of the corresponding coefficients.

In one example of the field arrangement, the amplitude field and the phase field of the same coefficient are adjacent to each other, with the field corresponding to the polarization direction corresponding to the strongest coefficient at front and the field corresponding to the other polarization direction at the back, as shown in the following manner:

$\{G_0, H_0, G_1, H_1, \ldots, G_{K_A}, H_{K_A}, G_0^*, H_0^*, G_1^*, H_1^*, \ldots, G_{K_B}^*, H_{K_B}^*\}$,
or $\{H_0, G_0, H_1, G_1, \ldots, H_{K_A}, G_{K_A}, \ldots H_0^*, G_0^*, H_1^*, G_1^*, \ldots, H_{K_B}^*, G_{K_B}^*\}$.

In another example, the fields carrying the amplitudes corresponding to the strongest polarization direction is located first, followed by the fields carrying the phases corresponding to the strongest polarization direction, then by the fields carrying the amplitudes corresponding to the other polarization direction, and finally by the fields carrying the phases corresponding to the other polarization direction in the following manner: $\{G_0, G_1, \ldots, G_{K_A}, H_0, H_1^*, \ldots, H_{K_A}, G_0^*, G_1^*, \ldots, G_{K_B}^*, H_0^*, H_1^*, \ldots, H_{K_B}^*\}$.

In another arrangement example, the fields carrying the phases corresponding to the strongest polarization direction is located first, followed by the fields carrying the amplitudes corresponding to the strongest polarization direction, then by the fields carrying the phases corresponding to the other polarization direction, and finally by the fields carrying the amplitudes corresponding to the other polarization direction in the following manner: $\{H_0, H_1, \ldots, H_{K_A}, G_0, G_1, \ldots, G_{K_A}, H_0^*, H_1^*, \ldots, H_{K_B}^*, G_0^*, G_1^*, \ldots, G_{K_B}^*\}$.

Such a processing manner enables the field corresponding to the polarization direction corresponding to the strongest coefficient at front, improves the reliability of the transmission of the field corresponding to the polarization direction corresponding to the strongest coefficient, and thus improves the transmission performance of the bit sequences of the uplink control information.

The processing unit 52 configures the second field carrying the domain indicating the position of the strongest coefficient in the first matrix before a seventh field carrying the domain indicating the fed-back elements in the first matrix.

For example, the seventh field carrying the domain indicating the fed-back elements in the first matrix is located closely after the second field carrying the domain indicating the position of the strongest coefficient in the first matrix C.

Alternatively, the seventh field carrying the domain indicating the fed-back elements in the first matrix is located after the second field carrying the domain indicating the position of the strongest coefficient in the first matrix C, with one or more other fields located between the seventh field and the second field.

In another manner, the processing unit 52 arranges at least one field carrying the domain of the fed-back elements in the first matrix based on the order of the fed-back elements in the first matrix.

For example, the fed-back elements in the first matrix C are $\{q_0, q_1, \ldots, q_{K_C}\}$ based on the order of the coefficients indicated in the first field carrying the domain indicating the information of the second matrix $C_{map}$; the corresponding fields carrying the amplitudes of the coefficients are $\{\overline{G}_0, \overline{G}_1, \ldots, \overline{G}_{K_C}\}$ sequentially; and the corresponding fields carrying the phases of the coefficients are $\{\overline{H}_0, \overline{H}_1, \ldots, \overline{H}_{K_C}\}$ sequentially. Accordingly, the fields carrying the amplitudes of the coefficients and the fields carrying the phases of the coefficients are arranged as $\{\overline{G}_0, \overline{H}_0, \overline{G}_1, \overline{H}_1, \ldots, \overline{G}_{K_C}, \overline{H}_{K_C}\}$, $\{\overline{H}_0, \overline{G}_0, \overline{H}_1, \overline{G}_1, \ldots, \overline{H}_{KC}, \overline{G}_{K_C}\}$, $\{\overline{G}_0, \overline{G}_1, \ldots, \overline{G}_{K_C}\}\{\overline{H}_0, \overline{H}_1, \ldots, \overline{H}_{K_C}\}$, or $\{\overline{H}_0, \overline{H}_1, \ldots, \overline{H}_{K_C}, \overline{G}_0, \overline{G}_1, \ldots, \overline{G}_{K_C}\}$.

It is to be noted that fields in the second partial field are arranged adjacently and sequentially with no other field between two adjacent fields to form the second bit sequence.

For example, the fields carrying the preceding information domains are arranged as follows: {the field carrying the domain indicating the information of the bit matrix $C_{map}$, the field carrying the domain indicating the strongest position of the coefficient in the first matrix C, the field carrying the domain indicating the reference amplitude of the second polarization direction, the field carrying the domain indicating a coefficient amplitude in the first matrix C, the field carrying the domain indicating a coefficient phase in the matrix C}.

Another field arrangement manner may be as follows: {the field carrying the domain indicating the information of the bit second matrix $C_{map}$, the field carrying the domain indicating the strongest position of the coefficient in the first matrix C, the field carrying the domain indicating the reference amplitude of the second polarization direction, the field carrying the domain indicating a coefficient phase in the first matrix C, the field carrying the domain indicating a coefficient amplitude in the first matrix C}.

The processing unit 52 arranges the fields carrying the precoding information of each layer based on the order of precoding layers.

For example, the rank of the precoding is 2; that is, the precoding has two layers in total, that is, {layer 1 precoding, layer 2 precoding}; and a field of each layer is arranged based on the order of the precoding layers as follows: {the field carrying layer 1 precoding information, the field carrying layer 2 precoding information}. In another example, the rank of the precoding is 3; that is, the precoding has three layers in total, that is, {layer 1 precoding, layer 2 precoding, layer 3 precoding}; and a field of each layer is arranged based on the order of the precoding layers as follows: {the field carrying layer 1 precoding information, the field carrying layer 2 precoding information, the field carrying layer 3 precoding information}. In another example, the rank of the precoding is 4; that is, the precoding has four layers in total, that is, {layer 1 precoding, layer 2 precoding, layer 3 precoding, layer 4 precoding}; a field of each layer is arranged based on the order of the precoding layers as follows: {the field carrying layer 1 precoding information, the field carrying layer 2 precoding information, the field carrying layer 3 precoding information, the field carrying layer 4 precoding information}.

The processing unit 52 arranges the fields carrying the precoding information of each layer based on the order of precoding layers.

The processing unit 52 configures a field carrying the domain indicating the number of the fed-back elements in the first matrix at the front of the first partial field.

For example, {the field carrying the domain indicating the number of the fed-back elements in the first matrix, the field carrying the domain indicating a wideband channel quality indicator of the first transport block, the field carrying the domain indicating a subband differential channel quality indicator of the first transport block}.

In another example, {the field carrying the domain indicating the number of the fed-back elements in the first matrix, the field carrying the domain indicating a rank of precoding, the field carrying the domain indicating a wideband channel quality indicator of the first transport block, the field carrying the domain indicating a subband differential channel quality indicator of the first transport block}.

The processing unit 52 determines the number of fields carrying the domain indicating the number of the fed-back elements in the first matrix based on the maximum value of the rank configured by a base station for a terminal device.

The processing unit 52 indicates the fed-back rank of the precoding based on the number of fields carrying the number of non-zero values.

It is to be understood that specific functions of each unit in this embodiment are the same as the processing in a preceding method embodiment and are not repeated here.

Finally, based on the preceding scheme, an example of constituting the first bit sequence and the second bit sequence is provided hereinafter.

The first partial field is sequentially connected to form the first bit sequence, for example, {the field carrying the domain indicating a rank of precoding, the field carrying the domain indicating a wideband channel quality indicator (CQI) of a first transport block (TB), the field carrying the domain indicating a subband differential channel quality indicator (CQI) of the first transport block (TB), the field indicating the number of the fed-back elements in the matrix C}.

The second partial field is sequentially connected to form the second bit sequence, for example, {the field carrying the domain indicating the information of the second matrix $C_{map}$, the field carrying the domain indicating the strongest position of the coefficient in the first matrix C, the field carrying the domain indicating the reference amplitude of the second polarization direction, the field carrying the domain indicating a coefficient amplitude in the matrix C, the field carrying the domain indicating a coefficient phase in the matrix C}, or {the field carrying the domain indicating the information of the bit matrix $C_{map}$, the carrying the domain indicating the strongest position of the coefficient in the matrix C, the field carrying the domain indicating the reference amplitude of the second polarization direction, the field carrying the domain indicating a coefficient phase in the matrix C, the field carrying the domain indicating a coefficient amplitude in the matrix C}.

Figure 7:
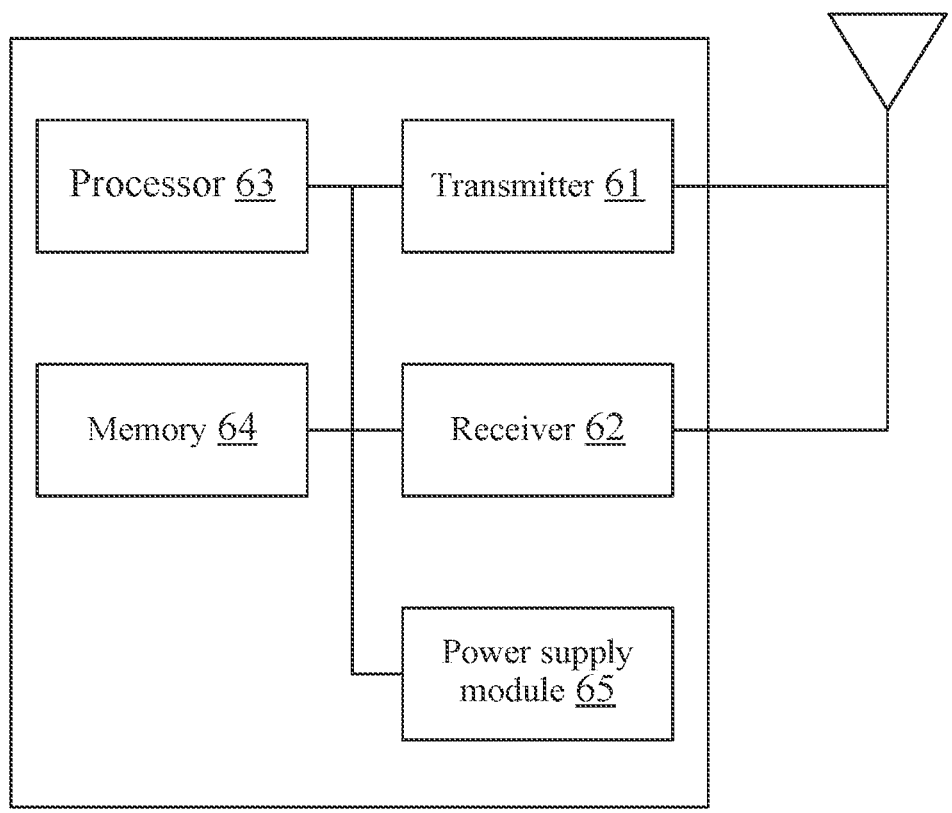
FIG. 7 is a diagram illustrating the structure of hardware of a terminal device according to an embodiment of the present application.

As shown in FIG. 7, FIG. 7 is a diagram illustrating the structure of hardware of a terminal device according to an embodiment of the present application. The terminal device may include a mobile terminal, for example, a mobile phone, a smartphone, a laptop, a digital broadcast receiver, a personal digital assistant (PDA), a portable Android device (PAD), a portable multimedia player (PMP), and a navigation apparatus; and a stationary terminal, for example, a digital television (TV) and a desktop computer. It is assumed that the terminal is a mobile terminal hereinafter. However, those skilled in the art will understand that apart from elements particularly used for a mobile purpose, the configuration according to embodiments of the present application can also be applied to a fixed-type terminal.

The terminal device may include a wireless communication unit and specifically, may be composed of, for example, a transmitter 61, a receiver 62, a processor 63, a memory 64, and a power supply module 65 that are in the figure. The figure illustrates the terminal device with multiple assemblies; however, it is to be understood that not all the illustrated assemblies are required to be implemented. More or fewer assemblies may be implemented instead. The preceding transmitter may be an entity component of an information sending unit in this embodiment, and the processor may be a processing unit and a mapping unit in this embodiment.

It can be seen that through the preceding embodiment, one or more information domains of the channel state information are mapped to the uplink control information, specifically, to a first partial field and a second partial field that are in the uplink control information; moreover, a first bit sequence and a second bit sequence are formed by the first partial field and the second partial field respectively. In this case, the channel state information is mapped to the uplink control information.

Additionally, since the preceding embodiment further provides that the domain indicating the position of the strongest coefficient in a first matrix is mapped to a sequence consisting of N bits, the complexity of calculating the position of the strongest element in the first matrix is reduced. Moreover, the arrangement in which the field corresponding to the fed-back elements belonging to a first polarization direction locating the strongest element is located before a sixth field corresponding to the fed-back elements belonging to a second polarization direction guarantees the reliability of information transmission.

Figure 8:
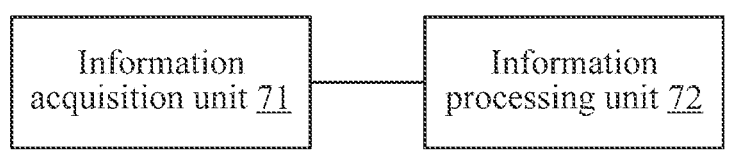
FIG. 8 is a diagram illustrating the structure of a network device according to an embodiment of the present application.

In another exemplary embodiment, a network device is provided, as shown in FIG. 8. The network device includes an information acquisition unit 71 and an information processing unit 72.

The information acquisition unit 71 is configured to acquire a first bit sequence and a second bit sequence from uplink control information, to acquire a first partial field from the first bit sequence, and to acquire a second partial field from the second bit sequence.

The information processing unit 72 is configured to acquire one or more information domains constituting channel state information based on the first partial field and the second partial field.

The first partial field is used for carrying at least one of the following information domains of the channel state information: a domain indicating a rank of precoding, a domain indicating a wideband channel quality indicator of a first transport block, a domain indicating a subband differential channel quality indicator of the first transport block, or a domain indicating the number of fed-back elements in a first matrix.

The second partial field is used for carrying at least one of the following information domains of the channel state information: a domain indicating the information of a second matrix, a domain indicating the position of the strongest coefficient in the first matrix, a domain indicating the reference amplitude of a second polarization direction, or a domain indicating the fed-back elements in the first matrix; and the domain indicating the fed-back elements in the first matrix includes a domain indicating amplitudes of the fed-back elements in the first matrix and a domain indicating phases of the fed-back elements in the first matrix.

Elements in the second matrix are used for indicating positions of the fed-back elements in the first matrix.

Figure 9:
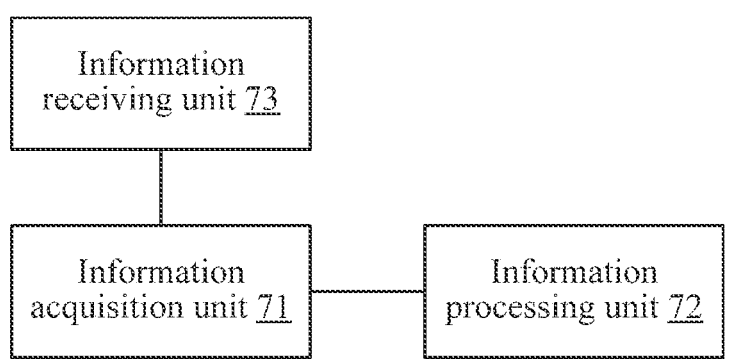
FIG. 9 is a diagram illustrating the structure of a network device according to another embodiment of the present application.

As shown in FIG. 9, the network device may further include an information receiving unit 73 configured to receive the uplink control information sent by a terminal device.

It is to be noted that the network device in this embodiment may be a device in the network, for example, a base station.

The constitution manner of precoding involved in this embodiment is the same as the preceding embodiment and is not repeated here.

As for the preceding processing flow, the information processing unit 72 determines two-dimensional matrix elements constituting a second matrix based on a one-dimensional sequence included in a first field included in a second partial field.

It is to be noted that the processing of converting a one-dimensional sequence to a two-dimensional matrix may be determined based on the number of rows of the second matrix and the number of columns of the second matrix. The number of elements to be acquired from the one-dimensional sequence to form the elements in each row of the second matrix is determined sequentially; then the acquired elements are added to the two-dimensional matrix based on the ascending order of the rows to acquire the second matrix.

For example, a one-dimensional sequence is that $X_C=[x_0, x_1, \ldots, x_{2LM-1}]$. Elements 0 to M−1 are taken as elements in the first row of the second matrix; in this manner, based on the ascending order of the rows, the second matrix of 2L rows and M columns are recovered and acquired.

The processing of converting a one-dimensional sequence to a two-dimensional matrix in this embodiment is contrary to the processing rule of mapping a two-dimensional matrix to a one-dimensional sequence in the preceding embodiment. Accordingly, the specific processing is not repeated.

The step in which one or more information domains constituting channel state information are acquired based on a first partial field and a second partial field includes the step below.

The position of the strongest coefficient in the first matrix is determined based on a sequence consisting of N bits included in a second field in the second partial field. Here N is an integer and is related to the maximum number of fed-back elements.

As for a sequence consisting of N bits, the determination of N is related to the maximum number of fed-back elements for example, N may be determined based on the formula that $\lceil \log_2(K_0) \rceil$. $K_0$ denotes the maximum possible number of the fed-back elements in the first matrix C that are configured by a base station for a terminal.

It is to be noted that the coefficients in the first matrix C are the elements in the first matrix C, and the coefficients refer to the coefficients of the columns in the matrix V and the coefficients of the rows in the matrix U. That is, the position of the strongest coefficient in the matrix C is the same as the position of the strongest element in the matrix C. The position of the strongest coefficient in the matrix C is (l*, m*), where l* denotes the reference number of the row where the strongest coefficient in the matrix C is located, and m* denotes the reference number of the column where the strongest coefficient in the matrix C is located. The strongest coefficient in the matrix C is only possible in the position of an element of the first matrix C indicated by the second matrix $C_{map}$. That is, it exists $K_0$ possible positions at most. A field sequence of $\lceil \log_2(K_0) \rceil$ bits is used for mapping one of the $K_0$ possible positions so that the overhead may be saved to the maximum extent.

For example, the correspondence relationship between the positions indicated in the field of the second matrix $C_{map}$ and the sequence states with the sequences constituted by $\lceil \log_2(K_0) \rceil$ bits is a first correspondence relationship. Based on the first correspondence relationship, $\lceil \log_2(K_0) \rceil$ bits are used for indicating the position of the strongest coefficient in the first matrix C. Alternatively, the correspondence relationship between the positions indicated in the field of the second matrix $C_{map}$ and the sequence states with the sequences constituted by $\lceil \log^2(K_0) \rceil$ bits is a second correspondence relationship. Based on the second correspondence relationship, $\lceil \log_2(K_0) \rceil$ bits are used for indicating the position of the strongest coefficient in the first matrix C.

Specifically, the first correspondence relationship is that the positions indicated in the field of the second matrix $C_{map}$ sequentially correspond to the sequence states. For example, position 1 in the second matrix $C_{map}$ corresponds to the sequence state 0 with the sequence constituted by $\lceil \log_2(K_0) \rceil$ bits; then the indicated positions in ascending order correspond to the bit sequences in ascending order. For example, $K_1$ positions are indicated in the field of $C_{map}$.

Here {position 1, position 2, ..., position $K_1$} sequentially correspond to {sequence state 0, sequence state 1, ..., sequence state $K_1-1$} in a one-to-one manner. The sequence state n indicates that n denotes the numeral constituted by a sequence. For example, the bit sequence 001 whose lowest bit is on the right constitutes a numeral 1; the bit sequence 010 whose lowest bit is on the right constitutes a numeral 2; the bit sequence 100 whose lowest bit is on the right constitutes a numeral 4; the bit sequence 001 whose lowest bit is on the left constitutes a numeral 4; the bit sequence 010 whose lowest bit is on the left constitutes a numeral 2; and the bit sequence 100 whose lowest bit is on the left constitutes a numeral 1.

A sequence of N bits is used for indicating a position. For example, when a sequence state is 3 and the positions in the second matrix correspond to the sequence states from front to back in a one-to-one manner, this sequence state indicates position 4 in the second matrix. Then the strongest element in the first matrix is determined based on the element in position 4 in the second matrix.

Such arrangement in which the correspondence is performed based on the order of the positions indicated in the field of the second matrix $C_{map}$ can reduce the complexity of calculating the position of the strongest element in the first matrix C; the relationship in which the ascending order of the positions indicated in the field of the second matrix $C_{map}$ corresponds to the ascending order of the sequence states can reduce the complexity of calculating the position of the strongest element in the first matrix C; and the relationship in which the position 1 indicated in the field of the second matrix $C_{map}$ corresponds to the sequence state 0 can reduce the complexity of calculating the position of the strongest element in the first matrix C.

The second correspondence relationship is that position 1 indicated in the field of the second matrix $C_{map}$ corresponds to the sequence state $(2^b-1)$ with the sequence constituted by $\lceil \log_2(K_0) \rceil$ bits; then the indicated positions in ascending order correspond to bit sequences in descending order. For example, $K_1$ positions are indicated in the field of the second matrix $C_{map}$; and here {position 1, position 2, ..., position $K_1$} sequentially correspond to {sequence state $2^b-1$, sequence state $2^b-2$, ..., sequence state $2^b-K_1$} in a one-to-one manner, where $\lceil \log_2(K_0) \rceil$. The sequence state n indicates that n denotes the numeral constituted by a sequence. For example, the bit sequence 001 whose lowest bit is on the right constitutes a numeral 1; the bit sequence 010 whose lowest bit is on the right constitutes a numeral 2; the bit sequence 100 whose lowest bit is on the right constitutes a numeral 4; the bit sequence 001 whose lowest bit is on the left constitutes a numeral 4; the bit sequence 010 whose lowest bit is on the left constitutes a numeral 2; and the bit sequence 100 whose lowest bit is on the left constitutes a numeral 1.

Similarly, such arrangement in which the correspondence is performed based on the order of the positions indicated in the field of the second matrix $C_{map}$ can reduce the complexity of calculating the position of the strongest element in the first matrix C; the relationship in which the ascending order of the positions indicated in the field of the second matrix $C_{map}$ corresponds to the descending order of the sequence states can reduce the complexity of calculating the position of the strongest element in the first matrix C; and the relationship in which the position 1 indicated in the field of the second matrix $C_{map}$ corresponds to the last sequence state can reduce the complexity of calculating the position of the strongest element in the first matrix C.

The information processing unit 72 determines the information of the second matrix based on the first field in the second partial field and determines the position of the strongest coefficient in the first matrix based on the second field located in the first field in the second partial field.

Here the second field includes a sequence consisting of N bits, and N is an integer and is related to the maximum number of fed-back elements configured by a network device.

The manner of determining the sequence constituted by N bits included in the second field is as described above and is not repeated here.

The field carrying the domain indicating the information of the second matrix $C_{map}$ is relatively important since the acquisition of the position of the strongest coefficient in the first matrix C based on the field carrying the domain indicating the position of the strongest coefficient in the first matrix C needs to be dependent on the information of the second matrix $C_{map}$. In a bit sequence of the uplink control information, a field located at front is more reliable than a field located at the back.

For example, the second field carrying the domain indicating the position of the strongest coefficient in the first matrix C is located closely after the first field carrying the domain indicating the information of the second matrix $C_{map}$; alternatively, after the first field carrying the domain indicating the information of the second matrix $C_{map}$, one or more other fields follow, and then the second field carrying the domain indicating the position of the strongest coefficient in the first matrix C is added.

Further, the information of the second matrix is determined based on the first field, and the position of the strongest coefficient in the first matrix is determined based on the second field.

The manner of determining the position of the strongest coefficient based on the content of the second field may be as described above and is not repeated here.

The information processing unit 72 determines a coefficient amplitude and a coefficient phase corresponding to a coefficient in the first matrix based on a third field and a fourth field that are adjacent to each other in the second partial field.

The third field and the fourth field are adjacent to each other, with no other field in between. That is, when the third field is acquired from the second partial field, it can be determined that the field adjacent to the third field is the fourth field, thus acquiring the coefficient amplitude and the coefficient phase that correspond to the coefficient in the first matrix.

For example, y denotes a fed-back and reported coefficient in the first matrix C; $A_y$ denotes the amplitude of y; $G_y$ denotes the field carrying $A_y$; $P_y$ denotes the phase of y; and $H_y$ denotes the field carrying $P_y$. In the second bit sequence, the field $G_y$ is closely adjacent to the field $H_y$ with no other field in between; for example, the two fields are arranged as $G_y H_y$ or $H_y G_y$.

In another example, z denotes another fed-back and reported coefficient in the first matrix C; $A_z$ denotes the amplitude of z; $G_z$ denotes the field carrying $A_z$; $P_z$ denotes the phase of z; and $H_z$ denotes the field carrying $P_z$. The fields carrying the amplitudes of the two coefficients and the fields carrying the phases of the two coefficients are arranged as $G_y H_y G_z H_z$, $H_y G_y H_z G_z$, $G_z H_z G_y H_y$, or $H_z G_z H_y G_y$; $G_y$ is closely adjacent to $H_y$ with no other field in between; and $G_z$ is closely adjacent to $H_z$ with no other field in between.

In this case, the arrangement in which the field carrying the amplitude of a coefficient is closely adjacent to the field carrying the phase of the coefficient can shorten the time for acquiring the coefficient. The acquired coefficient can be used without waiting for the acquisition of other coefficients; that is, the time of waiting for using the coefficient can be shortened.

The information processing unit 72 determines fed-back elements corresponding to a first polarization direction in the first matrix based on a fifth field in the second partial field.

The information processing unit 72 determines fed-back elements corresponding to the second polarization direction based on a sixth field located after the fifth field in the second partial field.

Here the first polarization direction is a polarization direction corresponding to the strongest coefficient in the first matrix, and the second polarization direction is a polarization direction different from the first polarization direction.

That is, the fifth field and the sixth field are acquired from the second partial field; based on a preset arrangement rule, it is determined that the fifth field located at front is for the fed-back elements corresponding to the first polarization direction and the sixth field is for the fed-back elements corresponding to the second polarization direction.

The field arrangement rule may be described as follows: $P_A$ denotes the polarization direction corresponding to the strongest coefficient in the first matrix C, the fifth field includes the fed-back elements $\{y_0, y_1, \ldots, y_{K_A}\}$ corresponding to the polarization direction $P_A$ in the first matrix C, $\{G_0, G_1, \ldots, G_{K_A}\}$ sequentially denote the fields carrying the amplitudes of the corresponding coefficients, and $\{H_0, H_1, \ldots, H_{K_A}\}$ sequentially denote the fields carrying the phases of the corresponding coefficients; $P_B$ denotes the other polarization direction, the sixth field includes the fed-back elements $\{z_0, z_1, \ldots, z_{K_B}\}$ corresponding to the polarization direction $P_B$ in the first matrix C, $\{G_0^*, G_1^*, \ldots, G_{K_B}^*,\}$ sequentially denote the fields carrying the amplitudes of the corresponding coefficients, and $\{H_0^*, H_1^*, \ldots, H_{K_B}^*\}$ sequentially denote the fields carrying the phases of the corresponding coefficients.

In one example of the field arrangement, the amplitude field and the phase field of the same coefficient are adjacent to each other, with the field corresponding to the polarization direction corresponding to the strongest coefficient at front and the field corresponding to the other polarization direction at the back, as shown in the following manner:

$\{G_0, H_0, G_1, H_1, \ldots, G_{K_A}, H_{K_A}, G_0^*, H_0^*, G_1^*, H_1^*, \ldots, G_{K_B}^*, H_{K_B}^*,\}$, or $\{H_0, G_0, H_1, G_1, \ldots, H_{K_A}, G_{K_A}, H_0^*, G_0^*, H_1^*, G_1^*, \ldots, H_{K_B}^*, G_{K_B}^*\}$.

With this arrangement, in the case of a network device performs parsing, the amplitude and phase of a coefficient corresponding to each of the two polarization directions may be acquired sequentially based on such a rule; then the amplitude and phase of the next coefficient are acquired; finally, the amplitude and phase of each coefficient are acquired.

In another example, the fields carrying the amplitudes corresponding to the strongest polarization direction is located first, followed by the fields carrying the phases corresponding to the strongest polarization direction, then by the fields carrying the amplitudes corresponding to the other polarization direction, and finally by the fields carrying the phases corresponding to the other polarization direction in the following manner: $\{G_0, G_1, \ldots, G_{K_A}, H_0, H_1, \ldots, H_{K_A}, G_0^*, G_1^*, \ldots, H_0^*, H_1^*, \ldots, H_{K_B}^*\}$. Correspondingly, a network device acquires amplitude fields and phase fields are acquired sequentially based on such an arrangement rule. For example, K elements as the coefficient amplitudes corresponding to the first polarization direction are acquired; then K elements as the coefficient phases corresponding to the first polarization direction are acquired; then K elements as the coefficient amplitudes corresponding to the second polarization direction are acquired; finally, K elements as the coefficient phases corresponding to the second polarization direction are acquired.

In another arrangement example, the fields carrying the phases corresponding to the strongest polarization direction is located first, followed by the fields carrying the amplitudes corresponding to the strongest polarization direction, then by the fields carrying the phases corresponding to the other polarization direction, and finally by the fields carrying the amplitudes corresponding to the other polarization direction in the following manner: $\{H_0, H_1 \ldots, H_{K_A}\}$, $G_0$, $G_1, \ldots, G_{K_A}$, $H_0^*, H_1^*, \ldots H_{K_B}^*, G_0^*, G_1^*, \ldots, G_{K_B}^*\}$. Correspondingly, a network device acquires amplitude fields and phase fields are acquired sequentially based on such an arrangement rule. For example, K elements as the coefficient phases corresponding to the first polarization direction are acquired; then K elements as the coefficient amplitudes corresponding to the first polarization direction are acquired; then K elements as the coefficient phases corresponding to the second polarization direction are acquired; finally, K elements as the coefficient amplitudes corresponding to the second polarization direction are acquired.

Such a processing manner enables the field corresponding to the polarization direction corresponding to the strongest coefficient at front, improves the reliability of the transmission of the field corresponding to the polarization direction corresponding to the strongest coefficient, and thus guarantees the transmission performance of the bit sequences of the uplink control information.

The information processing unit determines the position of the strongest coefficient in the first matrix based on the second field.

The information processing unit 72 determines the fed-back elements in the first matrix based on a seventh field located after the second field.

For example, after the second field is acquired to acquire the position of the strongest coefficient in the first matrix, the seventh field follows the second field closely; and the fed-back elements in the first matrix C are acquired from the seventh field.

Alternatively, after the second field is acquired to acquire the position of the strongest coefficient in the first matrix, the seventh field located after a preset number of adjacent fields is acquired; and the fed-back elements in the first matrix C are acquired from the seventh field. Here the preset number may be acquired through a pre-negotiation with the terminal device or determined by both parties according to a protocol. For example, three fields may be located between the second field and the seventh field; alternatively, more than three fields or less than three fields may be located between the second field and the seventh field. This is not exhaustive in this embodiment.

As for another arrangement manner of the fields indicating the fed-back elements in the first matrix, the step in which the one or more information domains constituting the channel state information are acquired based on the first partial field and the second partial field includes the step below.

The second matrix is determined based on the first field; and at least one field carrying the domain of the fed-back elements in the first matrix is determined based on the order of the fed-back elements in the first matrix, with the order indicated by the second matrix.

The fed-back elements in the first matrix are determined based on the at least one field.

For example, the second matrix is first acquired from the first field, and then at least one field carrying the domain of the fed-back elements is acquired. The fed-back elements in the first matrix C are $\{q_0, q_1, q_{K_C}\}$ based on the order of the coefficients indicated in the first field carrying the domain indicating the information of the second matrix $C_{map}$; the corresponding fields carrying the amplitudes of the coefficients are $\{\overline{G}_0, \overline{G}_1, \ldots, \overline{G}_{K_C}\}$ sequentially; and the corresponding fields carrying the phases of the coefficients are $\{\overline{H}_0, \overline{H}_1, \ldots, \overline{H}_{K_C}\}$ sequentially. Accordingly, the fields carrying the amplitudes of the coefficients and the fields carrying the phases of the coefficients are arranged as $\{\overline{G}_0, \overline{H}_0, \overline{G}_1, \overline{H}_1, \ldots, \overline{G}_{K_C}, \overline{H}_{K_C}\}$, $\{\overline{H}_0, \overline{G}_0, \overline{H}_1, \overline{G}_1, \ldots, \overline{H}_{K_C}, \overline{G}_{K_C}\}$, $\{\overline{G}_0, \overline{G}_1, \ldots, \overline{G}_{K_C}, \overline{H}_0, \overline{H}_1, \ldots, \overline{H}_{K_C}\}$, or $\{\overline{H}_0, \overline{H}_1, \ldots, \overline{H}_{K_C}, \overline{G}_0, \overline{G}_1, \ldots, \overline{G}_{K_C}\}$.

Finally, based on the preceding scheme, based on a preset arrangement order of fields in the first bit sequence and a preset arrangement order of fields in the second bit sequence, a network device may determine to which domain in the channel state information an acquired field corresponds. The preset arrangement order of fields in the first bit sequence and the preset arrangement order of fields in the second bit sequence may be determined by a protocol or may be acquired through a negotiation with a terminal device. One example of the preset arrangement order of fields in the first bit sequence and the preset arrangement order of fields in the second bit sequence is provided hereinafter.

The first partial field is sequentially connected to form the first bit sequence, for example, {the field carrying the domain indicating a rank of precoding, the field carrying the domain indicating a wideband channel quality indicator (CQI) of a first transport block (TB), the field carrying the domain indicating a subband differential channel quality indicator (CQI) of the first transport block (TB), the field indicating the number of the fed-back elements in the matrix C}.

The second partial field is sequentially connected to form the second bit sequence, for example, {the field carrying the domain indicating the information of the second matrix $C_{map}$, the field carrying the domain indicating the strongest position of the coefficient in the first matrix C, the field carrying the domain indicating the reference amplitude of the second polarization direction, the field carrying the domain indicating a coefficient amplitude in the matrix C, the field carrying the domain indicating a coefficient phase in the matrix C}, or {the field carrying the domain indicating the information of the bit matrix $C_{map}$, the carrying the domain indicating the strongest position of the coefficient in the matrix C, the field carrying the domain indicating the reference amplitude of the second polarization direction, the field carrying the domain indicating a coefficient phase in the matrix C, the field carrying the domain indicating a coefficient amplitude in the matrix C}.

In the second bit sequence, a field carrying the precoding information of each layer is arranged based on the order of the precoding layers.

The information acquisition unit acquires a field carrying the domain indicating the number of the fed-back elements in the first matrix from the front of the first partial field in the first bit sequence.

Here in the first bit sequence, a field carrying the domain indicating the number of the fed-back elements in the first matrix is located at the front of the first partial field.

The information processing unit determines the number of fields carrying the domain indicating the number of the fed-back elements in the first matrix based on the maximum value of the rank configured by a base station for a terminal device. Specifically, the fed-back rank of the precoding may be determined based on the number of fields carrying the number of non-zero values.

Figure 10:
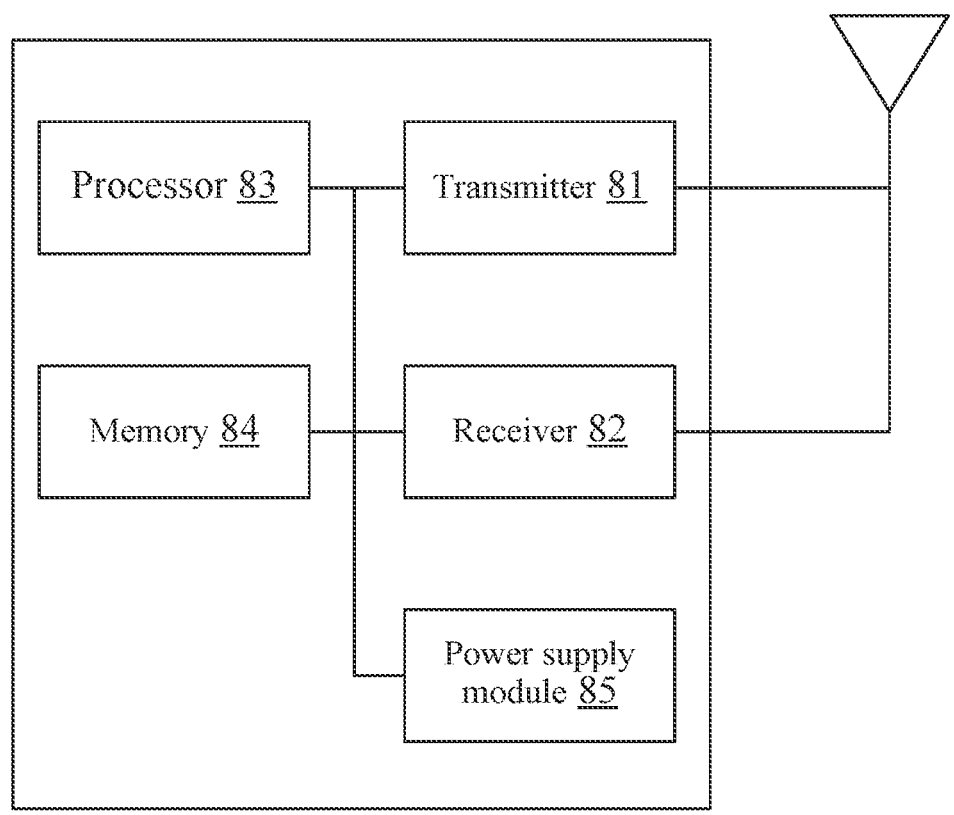
FIG. 10 is a diagram illustrating the structure of hardware of a network device according to an embodiment of the present application.

FIG. 10 is a diagram illustrating the structure of hardware of a network device, for example, a base station, according to this embodiment. The terminal device includes a transmitter 81, a receiver 82, a power supply module 85, a memory 84, and a processor 83. The receiver may be a preceding information receiving unit, and the processor may include a preceding information acquisition unit and a preceding information processing unit.

It can be seen that with the adoption of preceding embodiments, one or more information domains of channel state information are acquired based on uplink control information. Specifically, a first bit sequence and a second bit sequence are acquired from the uplink control information; a first partial field is acquired from the first bit sequence, and a second partial field is acquired from the second bit sequence; and the one or more information domains of the channel state information are acquired based on the first partial field and the second partial field. In this case, the channel state information can be acquired based on the uplink control information.

Figure 11:
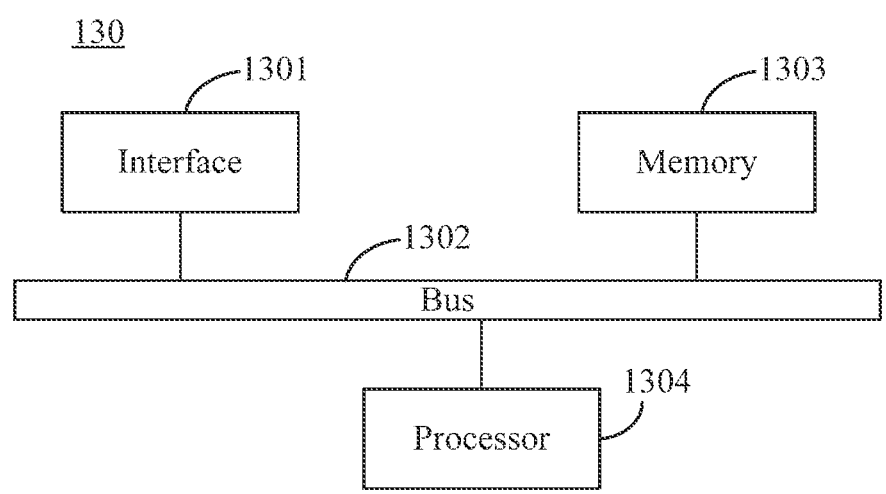
FIG. 11 is a diagram illustrating the structure of hardware of a terminal device according to another embodiment of the present application.

FIG. 11 is a diagram illustrating the structure of a terminal device according to an embodiment of the present application. As shown in FIG. 11, the terminal device 130 provided by the embodiment of the present application includes a memory 1303 and a processor 1304. The terminal device 130 may further include an interface 1301 and a bus 1302. The interface 1301, the memory 1303, and the processor 1304 are connected through the bus 1302. The memory 1303 is configured to store instructions. The processor 1304 is configured to read the instructions to execute the technical solutions of the preceding embodiments applied to the terminal device. The implementation principles and technical effects are similar and are not repeated here.

Figure 12:
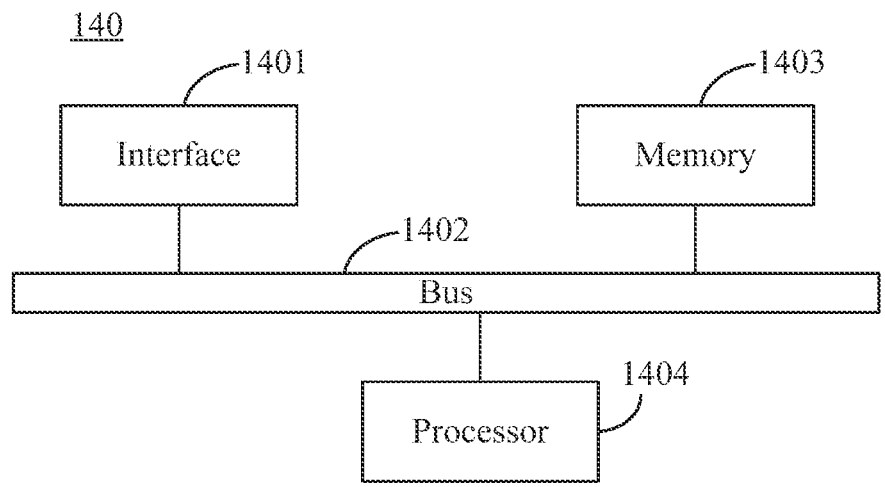
FIG. 12 is a diagram illustrating the structure of hardware of a network device according to another embodiment of the present application.

FIG. 12 is a diagram illustrating the structure of a base station according to the present application. As shown in FIG. 12, the base station 140 provided by an embodiment of the present application includes a memory 1403 and a processor 1404. The base station may further include an interface 1401 and a bus 1402. The interface 1401, the memory 1403, and the processor 1404 are connected through the bus 1402. The memory 1403 is configured to store instructions. The processor 1404 is configured to read the instructions to execute the technical solutions of the preceding embodiments applied to the base station. The implementation principles and technical effects are similar and are not repeated herein.

Figure 13:
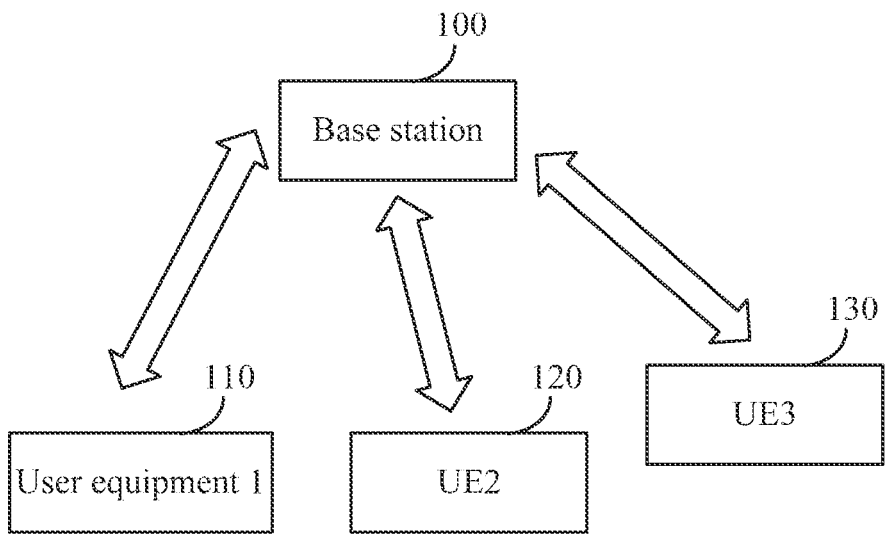
FIG. 13 is a diagram illustrating the structure of a communication system according to an embodiment of the present application.
Figure 14:
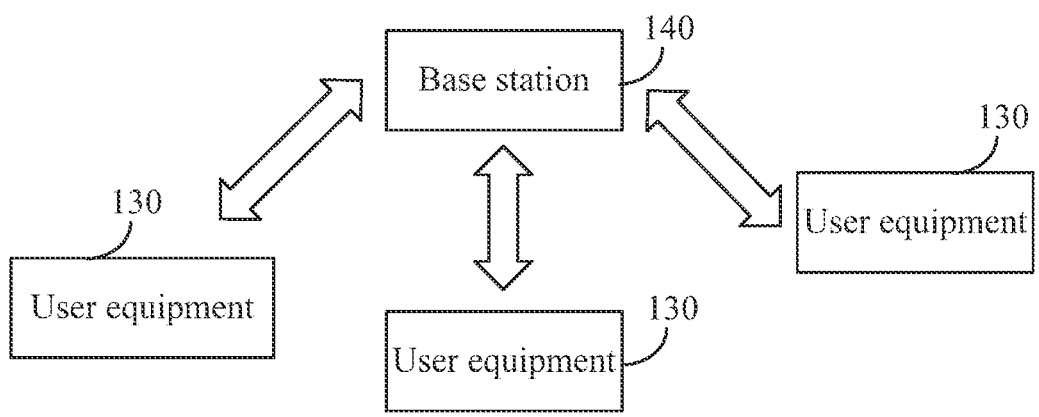
FIG. 14 is a diagram illustrating the structure of a communication system according to another embodiment of the present application.

FIG. 13 is a diagram illustrating the structure of a communication system according to an embodiment of the present application. In this embodiment, the description is made taking an example in which a network device is a base station 100 and a terminal device may be a user equipment (UE) 110, 120, or 130 in the figure. The functions of the preceding base station and UE is the same as the preceding embodiments and are not repeated. Alternatively, as shown in FIG. 14, the system includes a user device 130 as shown in preceding embodiments and a base station 140 as shown in preceding embodiments. Similarly, the base station in the figure may be a network device in the embodiments; the user device is a preceding terminal device, and the functions implemented by the user device are the same as the functions implemented by the preceding terminal device. This is not repeated here.

The above are merely exemplary embodiments of the present application and are not intended to limit the scope of the present application.

It is to be understood by those skilled in the art that the term "user terminal" covers any suitable type of wireless user devices, for example, a mobile phone, a portable data processing apparatus, a portable web browser, or a vehicle-mounted mobile station.

In general, a plurality of embodiments of the present application may be implemented in hardware, a dedicated circuit, software, logic, or any combination thereof. For example, some aspects may be implemented in hardware while other aspects may be implemented in firmware or software that may be executed by a controller, a microprocessor, or other computing apparatuses, although the present application is not limited thereto.

Embodiments of the present application may be implemented by a data processor of a mobile apparatus executing computer program instructions. The implementation, for example, may be in a processor entity, by hardware, or by a combination of software and hardware. The computer program instructions may be assembly instructions, industry subversive alliance (ISA) instructions, machine instructions, machine-related instructions, microcodes, firmware instructions, status setting data, or source or object codes written in any combination of one or more programming languages.

A block diagram of any logic flow in drawings of the present application may represent program steps, or may represent interconnected logic circuits, modules, and functions, or may represent a combination of program steps, logic circuits, modules, and functions. The computer program may be stored in a memory. The memory may be of any type suitable for a local technical environment and may be implemented using any suitable data storage technology. The memory in embodiments of the present application may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), which serves as an external cache. Many forms of RAMs may be used, such as a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct rambus random-access memory (DRRAM). The memory of the system and the method described herein includes, but is not limited to, these and any other suitable types of memory.

The processor in embodiments of the present application may be of any type suitable for the local technical environment such as, but not limited to, a general-purpose computer, a special-purpose computer, a microprocessor, a digital signal processor (DSP), an application specific integrated circuit (ASIC), a field-programmable gate array (FPGA), any other programmable logic device, a discrete gate or transistor logic device, a discrete hardware component, and a processor based on a multi-core processor architecture. The general-purpose processor may be, for example, a microprocessor or any related processor. The preceding processor may implement or execute steps of the methods disclosed in embodiments of the present application. The software modules may be located at a random-access memory, a flash memory, a read-only memory, a programmable read-only memory, an electrically erasable programmable read-only memory, a register, or other established storage medium in the art. The storage medium is located in the memory. The processor reads the information in the memory and implements the steps of the preceding methods in combination with the hardware of the processor.

What is claimed is:

1. A method for wireless communication, comprising:
receiving, by a terminal device, one or more reference signals from a base station;
determining, by the terminal device, channel state information by measuring the one or more reference signals;
generating, by the terminal device, a first bit sequence of uplink control information based on a first partial field of the channel state information, the first partial field carrying an indicator indicating a number of coefficients in a first matrix, wherein the first matrix is determined based on L vectors and M vectors; and
generating, by the terminal device, a second bit sequence of the uplink control information based on a second partial field of the channel state information, the second partial field carrying information that comprises (1) information indicating a bitmap that identifies positions of the coefficients in the first matrix, (2) information identifying a strongest coefficient in the first matrix, and (3) information indicating an amplitude and a phase of the coefficients in the first matrix,
wherein a first field of the second bit sequence that corresponds to the information identifying the strongest coefficient in the first matrix is positioned immediately before a second field of the second bit sequence that corresponds to the information indicating the amplitude and the phase of the coefficients, wherein, in the second field, information of the amplitude of the coefficients is followed by information of the phase of the coefficients; and
transmitting the uplink control information comprising the first bit sequence and the second bit sequence to the base station.

2. The method of claim 1, wherein generating the second bit sequence based on the second partial field comprises:
generating a field of the second bit sequence that corresponds to the information indicating the amplitude and the phase of the coefficients in the first matrix based on an order indicated by the information indicating the bitmap that identifies positions of the coefficients in the first matrix.

3. The method of claim 1, wherein the first partial field further carries a rank indicator, a wideband channel quality indicator for a first transport block, and a subband differential channel quality indicator of the first transport block.

4. The method of claim 1, wherein the first bit sequence is generated by mapping the first partial field of the channel state information to the first bit sequence, and wherein the second bit sequence is generated by mapping the second partial field of the channel state information to the second bit sequence.

5. The method of claim 4, wherein mapping the second partial field of the channel state information to the second bit sequence of the uplink control information comprises:
mapping the information identifying the strongest coefficient in the first matrix to a sequence consisting of N bits, wherein N is an integer and is related to a maximum number of coefficients in the first matrix.

6. A method for wireless communication, comprising:
transmitting, by a base station, one or more reference signals to a terminal device to enable the terminal device to determine channel state information by measuring the one or more reference signals;
receiving, by the base station, uplink control information from the terminal device, the uplink control information comprising a first bit sequence and a second bit sequence,
wherein a first partial field of the channel state information is mapped to the first bit sequence, the first partial field carrying an indicator indicating a number of coefficients in a first matrix, wherein the first matrix is determined based on L vectors and M vectors, and
wherein a second partial field of the channel state information is mapped to the second bit sequence, the second partial field carrying information that comprises (1) information indicating a bitmap that identifies positions of the coefficients in the first matrix, (2) information identifying a strongest coefficient in the first matrix, and (3) information indicating an amplitude and a phase of the coefficients in the first matrix, and
wherein a first field of the second bit sequence that corresponds to the information identifying the strongest coefficient in the first matrix is positioned immediately before a second field of the second bit sequence that corresponds to the information indicating the amplitude and the phase of the coefficients, wherein, in the second field, information of the amplitude of the coefficients is followed by information of the phase of the coefficients.

7. The method of claim 6, wherein the information identifying the strongest coefficient in the first matrix is mapped to a sequence consisting of N bits, wherein N is an integer and is related to a maximum number of coefficients in the first matrix.

8. The method of claim 6, wherein a field of the second bit sequence that corresponds to the information indicating the amplitude and the phase of the coefficients in the first matrix is generated based on an order indicated by the information indicating the bitmap that identifies positions of the coefficients in the first matrix.

9. The method of claim 6, wherein the first partial field further carries a rank indicator, a wideband channel quality indicator for a first transport block, and a subband differential channel quality indicator of the first transport block.

10. A terminal device, comprising at least one processor that is configured to cause the terminal device to:
receive one or more reference signals from a base station;
determine channel state information by measuring the one or more reference signals;
generate a first bit sequence of uplink control information based on a first partial field of the channel state information, the first partial field carrying an indicator indicating a number of coefficients in a first matrix, wherein the first matrix is determined based on L vectors and M vectors;
generate a second bit sequence of the uplink control information based on a second partial field of the channel state information, the second partial field carrying information that comprises (1) information indicating a bitmap that identifies positions of the coefficients in the first matrix, (2) information identifying a strongest coefficient in the first matrix, and (3) information indicating an amplitude and a phase of the coefficients in the first matrix, wherein a first field of the second bit sequence that corresponds to the information identifying the strongest coefficient in the first matrix is positioned immediately before a second field of the second bit sequence that corresponds to the information indicating the amplitude and the phase of the coefficients, wherein, in the second field, information of the amplitude of the coefficients is followed by information of the phase of the coefficients; and transmit the uplink control information comprising the first bit sequence and the second bit sequence to a base station.

11. The terminal device according to claim 10, wherein the at least one processor is configured to generate the second bit sequence by:

generating a field of the second bit sequence that corresponds to the information indicating the amplitude and the phase of the coefficients in the first matrix based on an order indicated by the information indicating the bitmap that identifies positions of the coefficients in the first matrix.

12. The terminal device of claim 10, wherein the first partial field further carries a rank indicator, a wideband channel quality indicator for a first transport block, and a subband differential channel quality indicator of the first transport block.

13. The terminal device of claim 10, wherein the at least one processor is configured to cause the terminal device to generate the first bit sequence by mapping the first partial field of the channel state information to the first bit sequence, and wherein the at least one processor is configured to cause the terminal device to generate the second bit sequence by mapping the second partial field of the channel state information to the second bit sequence.

14. The terminal device of claim 13, wherein the at least one processor is configured to map the second partial field of the channel state information to the second bit sequence of the uplink control information by:

mapping the information identifying the strongest coefficient in the first matrix to a sequence consisting of N bits, wherein N is an integer and is related to a maximum number of coefficients in the first matrix.

15. A network device, comprising at least one processor that is configured to cause the network device to:

transmit one or more reference signals to a terminal device to enable the terminal device to determine channel state information by measuring the one or more reference signals;

acquire, from the terminal device, uplink control information comprising a first bit sequence and a second bit sequence, wherein a first partial field of the channel state information is mapped to the first bit sequence, the first partial field carrying an indicator indicating a number of coefficients in a first matrix, wherein the first matrix is determined based on L vectors and M vectors, and wherein a second partial field of the channel state information is mapped to the second bit sequence, the second partial field carrying information that comprises (1) information indicating a bitmap that identifies positions of the coefficients in the first matrix, (2) information identifying a strongest coefficient in the first matrix, and (3) information indicating an amplitude and a phase of the coefficients in the first matrix, and wherein a first field of the second bit sequence that corresponds to the information identifying the strongest coefficient in the first matrix is positioned immediately before a second field of the second bit sequence that corresponds to the information indicating the amplitude and the phase of the coefficients, wherein, in the second field, information of the amplitude of the coefficients is followed by information of the phase of the coefficients.

16. The network device of claim 15, wherein the information identifying the strongest coefficient in the first matrix is mapped to a sequence consisting of N bits, wherein N is an integer and is related to a maximum number of coefficients in the first matrix.

17. The network device of claim 15, wherein a field of the second bit sequence that corresponds to the information indicating the amplitude and the phase of the coefficients in the first matrix is generated based on an order indicated by the information indicating the bitmap that identifies positions of the coefficients in the first matrix.

18. The network device of claim 15, wherein the first partial field further carries a rank indicator, a wideband channel quality indicator for a first transport block, and a subband differential channel quality indicator of the first transport block.

* * * * *